United States Patent
Warnock, II

(10) Patent No.: US 9,289,945 B2
(45) Date of Patent: Mar. 22, 2016

(54) METHOD AND APPARATUS FOR WELDING A CURVED SEAM

(71) Applicant: Miller Weldmaster Corporation, Navarre, OH (US)

(72) Inventor: John Charles Warnock, II, Massillon, OH (US)

(73) Assignee: Miller Weldmaster Corporation, Navarre, OH (US)

( * ) Notice: Subject to any disclaimer, the term of this patent is extended or adjusted under 35 U.S.C. 154(b) by 231 days.

(21) Appl. No.: 13/923,767

(22) Filed: Jun. 21, 2013

(65) Prior Publication Data

US 2014/0374020 A1     Dec. 25, 2014

(51) Int. Cl.
| | |
|---|---|
| *B29C 65/10* | (2006.01) |
| *B29C 65/78* | (2006.01) |
| *D06H 5/00* | (2006.01) |
| *B29C 65/00* | (2006.01) |
| *B29C 65/20* | (2006.01) |

(52) U.S. Cl.
CPC .......... *B29C 65/7894* (2013.01); *B29C 65/103* (2013.01); *B29C 65/787* (2013.01); *B29C 66/1122* (2013.01); *B29C 66/43* (2013.01); *B29C 66/729* (2013.01); *B29C 66/83413* (2013.01); *B29C 66/845* (2013.01); *B29C 66/9141* (2013.01); *B29C 66/9161* (2013.01); *B29C 66/932* (2013.01); *B29C 66/934* (2013.01); *D06H 5/00* (2013.01); *B29C 65/20* (2013.01); *B29C 66/349* (2013.01); *B29C 66/7392* (2013.01); *B29C 66/73921* (2013.01)

(58) Field of Classification Search
CPC .... B29C 65/103; B29C 65/20; B29C 65/787; B29C 65/7894; B29C 66/1122; B29C 66/349; B29C 66/729; B29C 66/7392; B29C 66/83413; B29C 66/9141; B29C 66/9161; B29C 66/932; B29C 66/934; D06H 5/00; D06M 23/14
USPC ......... 156/359, 362, 367, 497, 499, 544, 555, 156/582
See application file for complete search history.

(56) References Cited

U.S. PATENT DOCUMENTS

| | | | | |
|---|---|---|---|---|
| 3,663,337 | A * | 5/1972 | Hulteen | 156/499 |
| 5,061,331 | A * | 10/1991 | Gute | 156/64 |
| 6,471,803 | B1 * | 10/2002 | Pelland et al. | 156/64 |
| 2009/0320729 | A1 * | 12/2009 | Henry et al. | 112/313 |

* cited by examiner

*Primary Examiner* — George Koch
(74) *Attorney, Agent, or Firm* — Sand & Sebolt

(57) ABSTRACT

A system and method for welding flexible fabric is presented. A welding system for flexible fabric includes a welding machine with a roller and a user interface. The welding machine is adapted to weld a first fabric to a second fabric using a first heat. The roller on the welding machine can be used to roll at a first speed the first fabric and/and or the second fabric through the welding machine. Later, an operator of the welding machine through the user interface sends a single speed control signal to the welding machine. Response of the single speed control signal, the welding machine changes from the first heat to a second heat and also changes the speed of the roller from the first speed to a second speed.

16 Claims, 20 Drawing Sheets

METHOD AND APPARATUS FOR WELDING A CURVED SEAM

BACKGROUND OF THE INVENTION

1. Field of Invention

The current invention relates generally to apparatus, systems and methods for connecting fabric together. More particularly, the apparatus, systems and methods relate to connecting flexible fabric together using heat. Specifically, the apparatus, systems and methods provide for connecting two flexible pieces of fabric together and controlling the welding heat, speed of the fabric and cooling air at a corner fold between the two pieces of fabric.

2. Description of Related Art

Heat welding has long been used to join waterproof sheet materials together to manufacture a variety of products such as tents, tarpaulins, liners for pools and landfills, awnings, military products and others. During the manufacturing process, two or more panels of flexible industrial fabric or technical textile, such as vinyl, are joined together into a single sheet. This is accomplished by overlapping sections of the panels of fabric and then applying heat and pressure to the overlapped sections to weld the materials together and form a seam. This procedure permits longer panels of the sheet materials to be produced so that the desired end product may be fabricated out of the same.

Various techniques have been developed to join sheet materials of this nature together. These include hot air welding, hot wedge welding and impulse welding. In hot air welding a nozzle is positioned so as to blow heated air between the two layers of sheet material. Typically, for a thermoplastic sheet material, the temperatures involved range anywhere from 200 F to 1,350 F (90 C to 750 C). Once the heat has been introduced between the layers, a roller passes over the same, applying a preset level of pressure to the layers. The combination of the heat and pressure joins the two panels of sheet materials together. Hot air welding requires precise temperatures and pressure to be applied to the sheet materials and also requires that the process be done in a timely fashion in order to prevent cooling of the sheet materials before the roller passes over the same.

Hot wedge welding is fairly similar to hot air welding, with the exception that instead of a nozzle being used to introduce heat into the system, a heated wedge is used. The wedge is positioned so that the fabric layers are pulled over the wedge immediately before they are contacted by the rollers. Wedges are typically heated to a temperature of between 200 F and 920 F (90 C and 490 C). Once again, the temperature, pressure and time have to be closely monitored in order to create a good seam.

While these approached to connecting two piece of fabric together work well when the seam is a continuous straight seam, they do not perform as well when a seam is curved or needs to form an angled turn such as at a 90 degree corner. Therefore, what is needed is a better way of connecting two pieces of fabric together.

SUMMARY

The preferred embodiment of the invention includes a system of welding flexible fabric together. A welding system for flexible fabric includes a welding machine with a roller and a user interface. The welding machine is adapted to weld a first fabric to a second fabric using a first heat. The roller on the welding machine can be used to roll at a first speed the first fabric and/and or the second fabric through the welding machine. Later, an operator of the welding machine through the user interface can send a single speed control signal to the welding machine. In response of the single speed control signal, the welding machine changes from the first heat to a second heat and also changes the speed of the roller from the first speed to a second speed. If the second speed is lower than the first speed, the welding machine can also cause ambient air to be blown onto the weld site so that fabric is not overheated.

Another configuration of the preferred embodiment is another welding system for welding two piece of fabric together. This system includes a conveyer table, a turntable, a welding machine, a controller and a user interface. The conveyer table initially feeds an un-welded sidewall fabric to the welding machine at a first speed. The turntable rotates to feed an un-welded second fabric to the welding machine at the first speed so that an edge of the second fabric overlaps an edge of the sidewall fabric. The welding machine is stationary and welds the un-welded sidewall fabric to the un-welded second fabric using a first welding temperature as the fabric moves through the welding machine at the first speed. A main roller in the welding machine rolls sidewall fabric and the second fabric that have been welded together as a welded fabric through the welding machine at the first speed. After some fabric has already been welded, the controller logic detects at a user interface a single request for a change of speed. When the controller detects the single request for the change of speed, the controller changes the first welding temperature to a second welding temperature, changes the speed of the turntable to so that the second fabric is delivered to the welding machine at a second speed that is different than the first speed, and changes the speed of the conveyer table so that the first fabric is delivered to the welding machine at the second speed. If the second speed is lower than the first speed, the controller can also cause ambient air to be blown onto the weld site so that fabric is not overheated.

Another configuration of the preferred embodiment is a method of welding two pieces of flexible fabric together. The method rotates a turntable to deliver an edge of a first fabric to a welding machine at a first speed. The method also rotates a conveyer belt to deliver an edge of a second fabric to the welding machine at the first speed. The first fabric and the second fabric are welded with a first heat.

After having welded some of the first fabric and the second fabric, a single request is received to change the first speed to a second speed. Responsive to the single request to change the first speed to the second speed the method switches from welding first fabric and the second fabric with the first heat to welding the first fabric and the second fabric with a second heat. Also, responsive to the single request to change the first speed to the second speed the method rotates the turntable to deliver the edge of a first fabric to the welding machine at the second speed and rotates the conveyer belt to deliver the edge of a second fabric to the welding machine at the second speed. The method is also novel because it can be performed by a single person.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
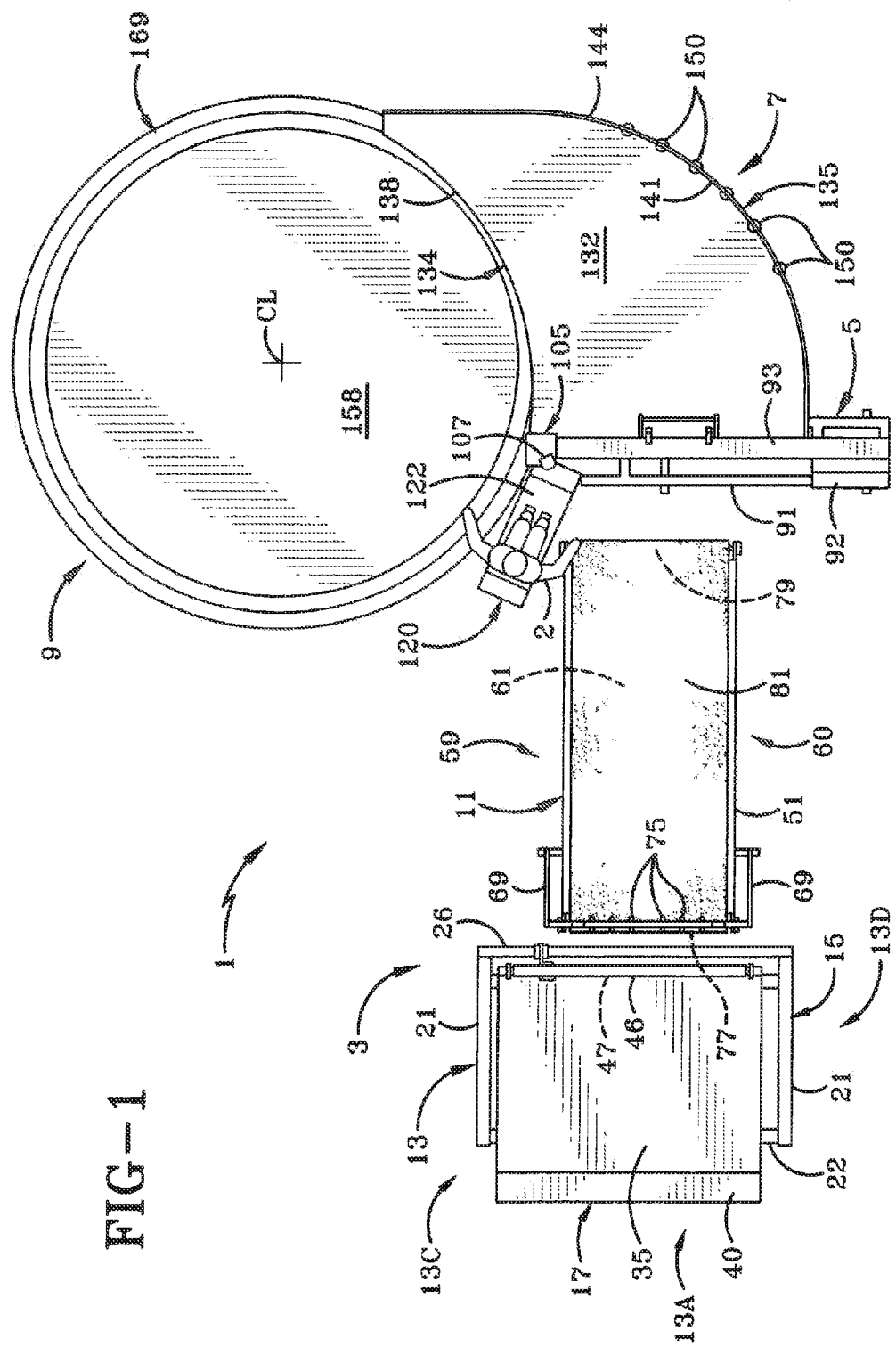
FIG. 1 illustrates a preferred embodiment of a system for connecting two pieces of fabric together where portions of the seam are curved and/or form an angled seam.

FIG. 1 illustrates a preferred embodiment of a welding system 1 for connecting two pieces of fabric together where portions of the seam are curved and/or form an angled seam. As illustrated, in general, a single person 2 has the ability to make curved welds using this welding system 1. As illustrated in this figure, in some of the main components of the system are a fabric feed assembly 3, a welding machine 5, a chute 7 and a turntable 9. The function of these components and some of the novel features of the welding system 1 will be briefly introduced before returning to a detailed description describing the structure and other components and details of the welding system 1.

The welding system 1 is used to weld two pieces of fabric together that are used as 3-dimentional products. One example of these products is the waterproof liners of swimming pools. Bottom fabric of a swimming pool would be placed evenly on the turntable 9 and side wall fabric of the pool would be loaded on the fabric feed assembly 3. In operation, the conveyer table 11 feeds the side wall of fabric to the welding machine 5 and at the same time the turntable 9 rotates an edge of the bottom fabric of the pool toward the welding machine 9 where edges of these two fabrics are welded. After welding, the fabric is rotated over the chute 7 that can have motorized rollers to guild the welded material onto the turntable 9. One unique feature of the welding system 1 is that through one control an operator of the system can simultaneously control the heat used to weld the fabric, the speed the fabric is being welded and optionally an amount of ambient air used to cool the weld. For example, a higher heat and fabric speed can be used to weld relatively straight seams and a lower heat and fabric speed with a higher rate of ambient air can be used to weld corners and/or sharply curved seams that are welded at a slower speed than straight welds. In the preferred embodiment, the operator can change the speed, welding temperature and the blowing of ambient air using a single foot pedal. The speed of the conveyer table 11, the welding machine 5 and the turntable are all simultaneously changed. In this document when a speed is mentioned, that speed is defined as the speed needed to deliver fabric to the welding machine 5. For example, if fabric is to be processed at a second speed, then the turntable 9, conveyer table 11 and welding machine each changes to their own second speed so as to deliver fabric through the welding machine 5 at the second speed.

Figure 2:
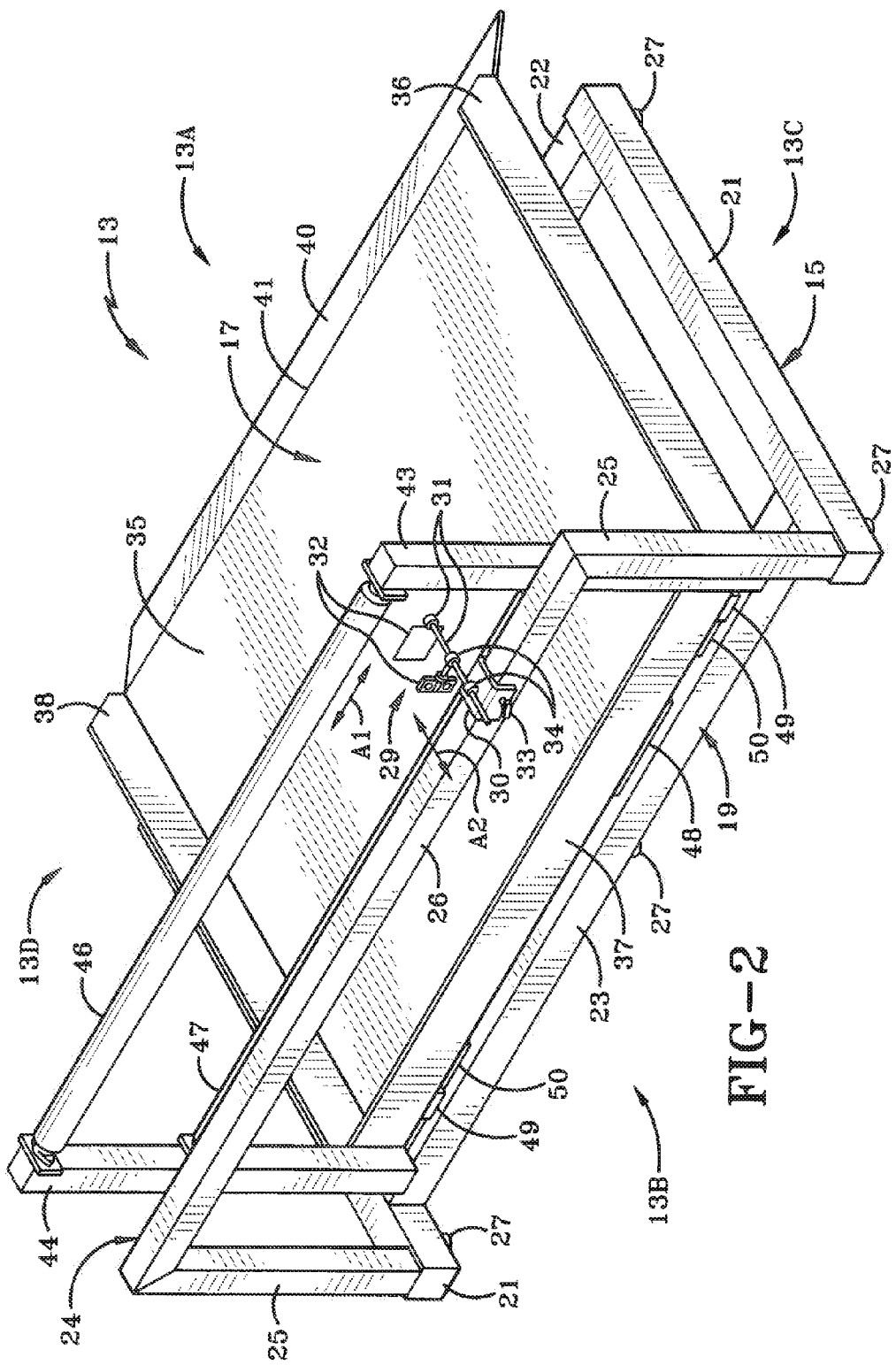
FIG. 2 illustrates a perspective view of a preferred embodiment of a fabric alignment platform of the welding system.

Returning to a detailed of the welding system, the fabric feed assembly 3 includes the conveyer table 11 as well as a fabric alignment platform 13. As best seen in FIG. 2, the fabric alignment platform 13 has a front side 13A, a back side 13B, a left side 13C and right side 13D. The fabric alignment platform 13 has includes both a fixed frame 15, that does not move and a movable platform 17. The fixed frame 15 is a rigid structure that sits on the floor and includes a base unit 19 formed form out of side beams 21, a front beam 22 and a back beam 23. The fixed frame 15 further includes an elevated rear structure 24 formed with left and right upwardly pointing side beams 25 as well as an upper beam 26. The beams forming the fixed frame 15 are are formed rigid material and in the preferred embodiment are formed out of hollow steel bars. Several feet/leveling devices 27 can be attached under the base 19 unit to allow it to easily be leveled.

A photo eye assembly 29 (e.g., photoelectric sensor) can be mounted on the upper beam 26. An eye base unit 30 supports other rigid support structures 31 upon which components of a photo eye assembly 32 are mounted. A quick release handle tightening device 33 is mounted in the eye base unit 30 and allows the quick movement of the photo eye assembly 29 in the directions of arrow A1 before being used to tighten the photo eye assembly 29 to the upper beam 26. Screw type of devices 34 on various components of the photo eye assembly 32 allow them to be loosened, moved in the direction of arrow A2 and then retightened when they are in there desired positions.

The moveable platform 17 has a lower platform 35. The lower platform 35 can be formed out of rigid material such as a sheet of metal and it can be mounted upon a rigid frame formed out of hollow metal or another material. The lower platform 35 can have a left side wall 36, back side wall 37 and right side wall 38. These side walls should be sufficiently tall to prevent material placed on the moveable platform 17 from sliding off the lower platform 35. A ramp plate 40 be attached to a front edge of the lower platform 35 and is angled in a downward direction from the lower platform 35. The ramp plate 40 may be formed out of the same material as the lower platform 35 and can be formed by bending it downward at time of manufacture. The lower platform 35 includes an upward pointing left rear beam 43 and a right rear beam 44 formed out of rigid material such as a hollow metal beams or another material.

Figure 3:
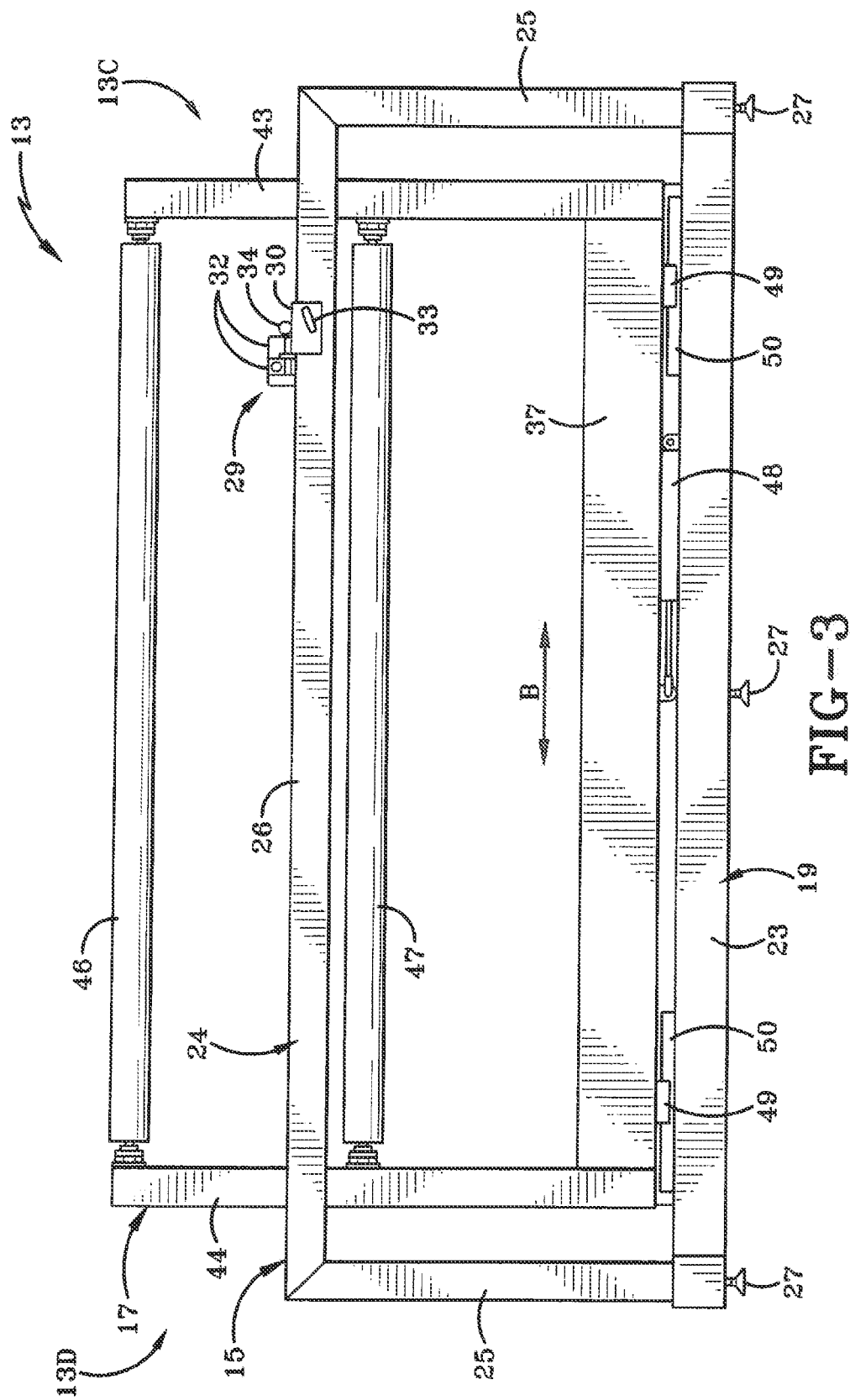
FIG. 3 illustrates a front view of a preferred embodiment of a fabric alignment platform of the welding system.
Figure 4:
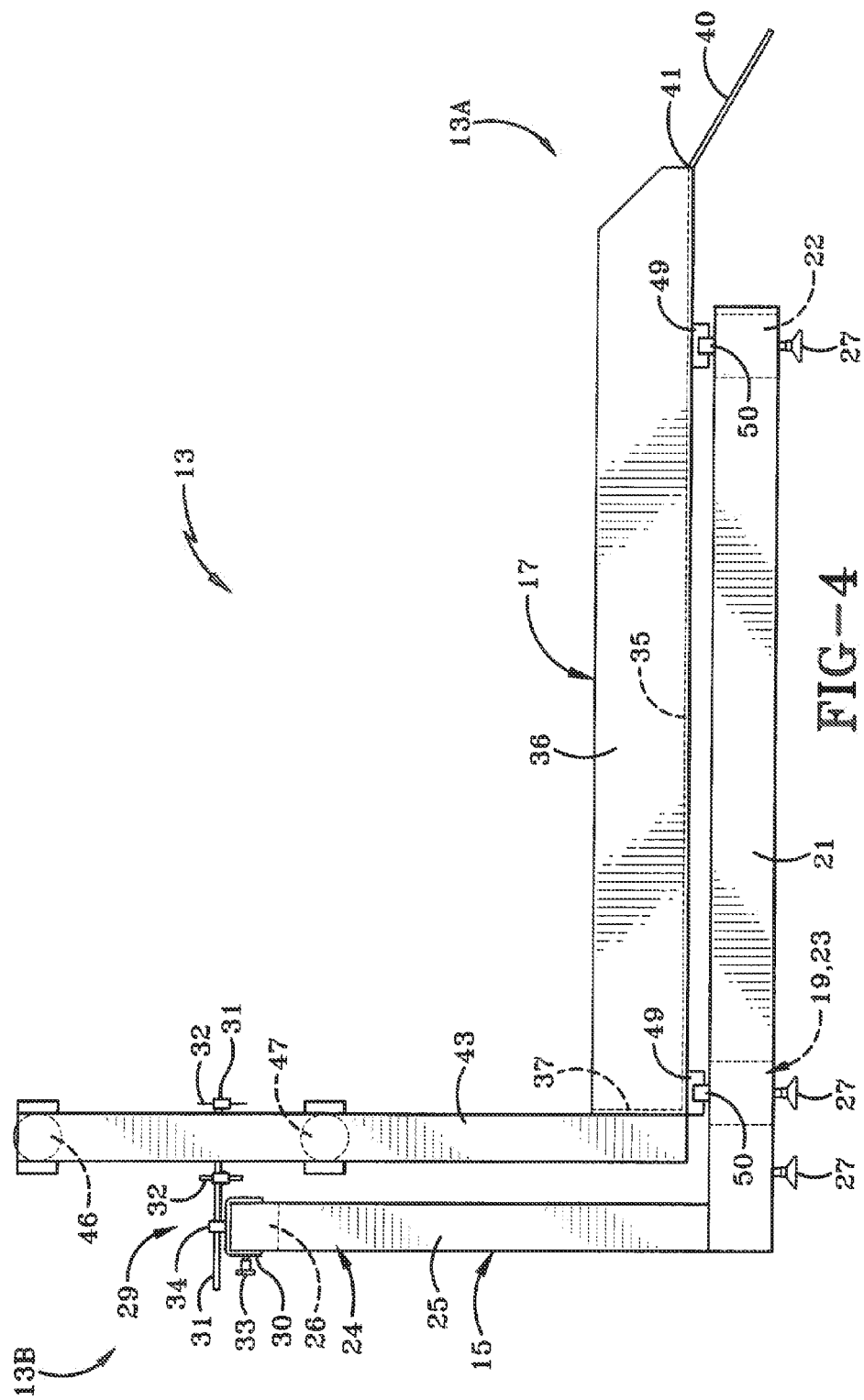
FIG. 4 illustrates a side view of a preferred embodiment of a fabric alignment platform of the welding system.

An upper idle roller idle roller 46 and a lower idle roller 47 are mounted with roller mounting devices between the left rear beam 43 and a right rear beam 44. These rollers 46, 47 can be any rollers useful for guiding fabric from the fabric feed assembly 3 to the conveyer table 11 as understood by one of ordinary skill in the art. As best seen in FIG. 3, the fixed frame 15 and the movable platform 17 are mechanically connected together with an actuator 48. In the preferred embodiment, the actuator 48 is a linear actuator. Two pairs of guides 49 and guide rails 50 cooperate with the actuator 48 to move the movable platform back and forth in the direction of arrow B and as discussed below.

Figure 5:
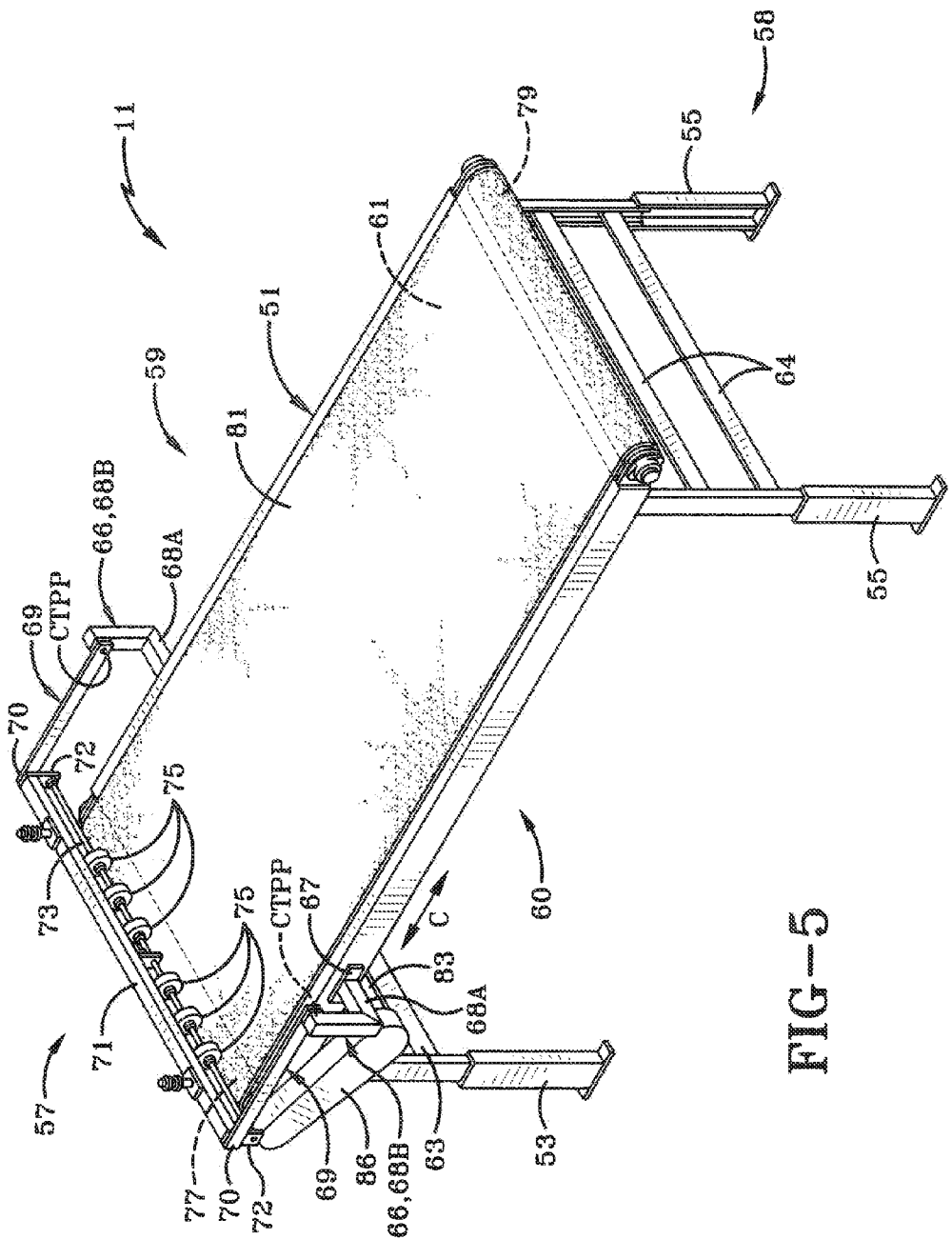
FIG. 5 illustrates a perspective view of a conveyor table of the welding system.
Figure 6:
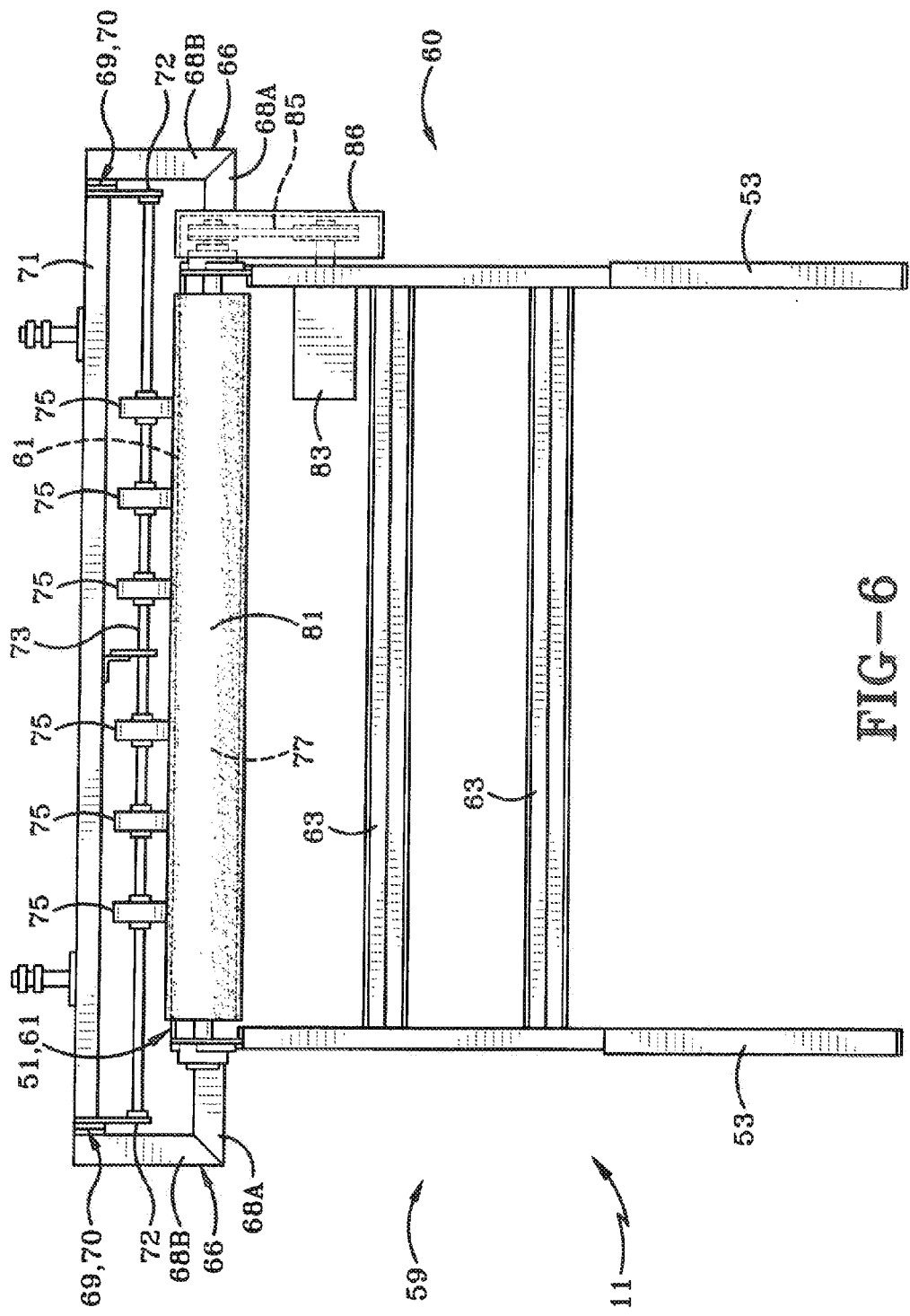
FIG. 6 illustrates a front view of a conveyor table of the welding system.
Figure 7:
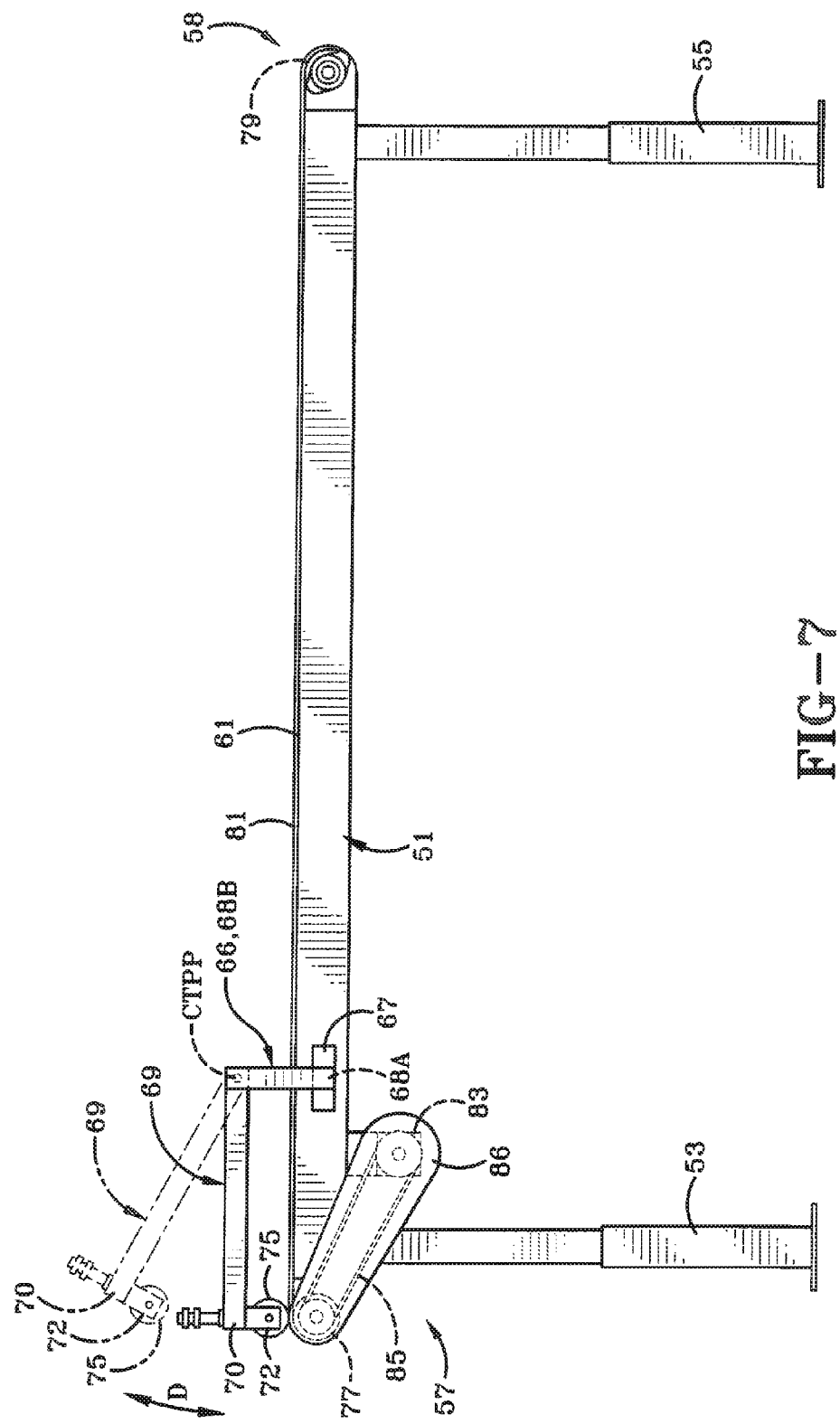
FIG. 7 illustrates a front view of a conveyor table of the welding system of the welding system.

As illustrated in FIGS. 5-7, the conveyer table 11 of the preferred embodiment is about 10 feet long and about 4 feet wide. The conveyer table 11 includes an elongate upper supporting frame 51 supported by a pair of front legs 53 and a pair of rear legs 55. The upper supporting frame 51 has a front end 57 and a back end 58. A left side 59 and a right side 60 of the supporting frame can be formed using elongated metallic C-channels and sheet metal can be used to create a flat upper surface 61. Rigid front cross-members 63 can be attached to the front legs 53 and rigid rear cross-members 64 can be attached to the rear legs 55 to provide the legs with additional support.

The conveyer table 11 further includes a pair of L-shaped support arms 66 that extend outward from rectangular plates 67 attached respectively to the left side 59 and the right side 60 of the conveyer table 11. In one configuration, these arms could be formed with a horizontal lower portion 68A and an upward pointing upper portion 68B. Rigid swing arms 69 are pivotally attached at pivot conveyer table pivot points (CT-PPs) at ends of the L-shaped support arms 66 and can pivotally move in the direction of arrow D. Front ends 70 of the rigid swing arms 69 are attached to a rigid cross-member 71. Short arms 72 are attached at the front ends 70 of the rigid swing arms 69 as well as the cross-member 71 and are oriented generally orthogonal to the swing arms 69 and the cross-member 71. A roller support rod 73 is attached between ends of the short arms 72 that are not attached to the rigid swing arms 69 and the cross-member 71. Idle rollers 75 are rotatably attached to the roller support rod 73.

The conveyer table 11 further includes a drive roller 77 mounted at its front end 57 and a back roller 59 mounted at its rear back end 58. A wide belt 81 is located around the drive roller 77 and the back roller 79 and is driven by the drive roller 77. An electric motor 83 is mounted under the upper surface near the front end 57 of the conveyer table 11. A drive belt 85 is connected around the drive roller 77 and the motor 83 and as discussed later is used for pulling fabric in the direction of arrow C. A protective housing 86 (FIGS. 5-7) covers drive belt 84 and motor 83.

Figure 8:
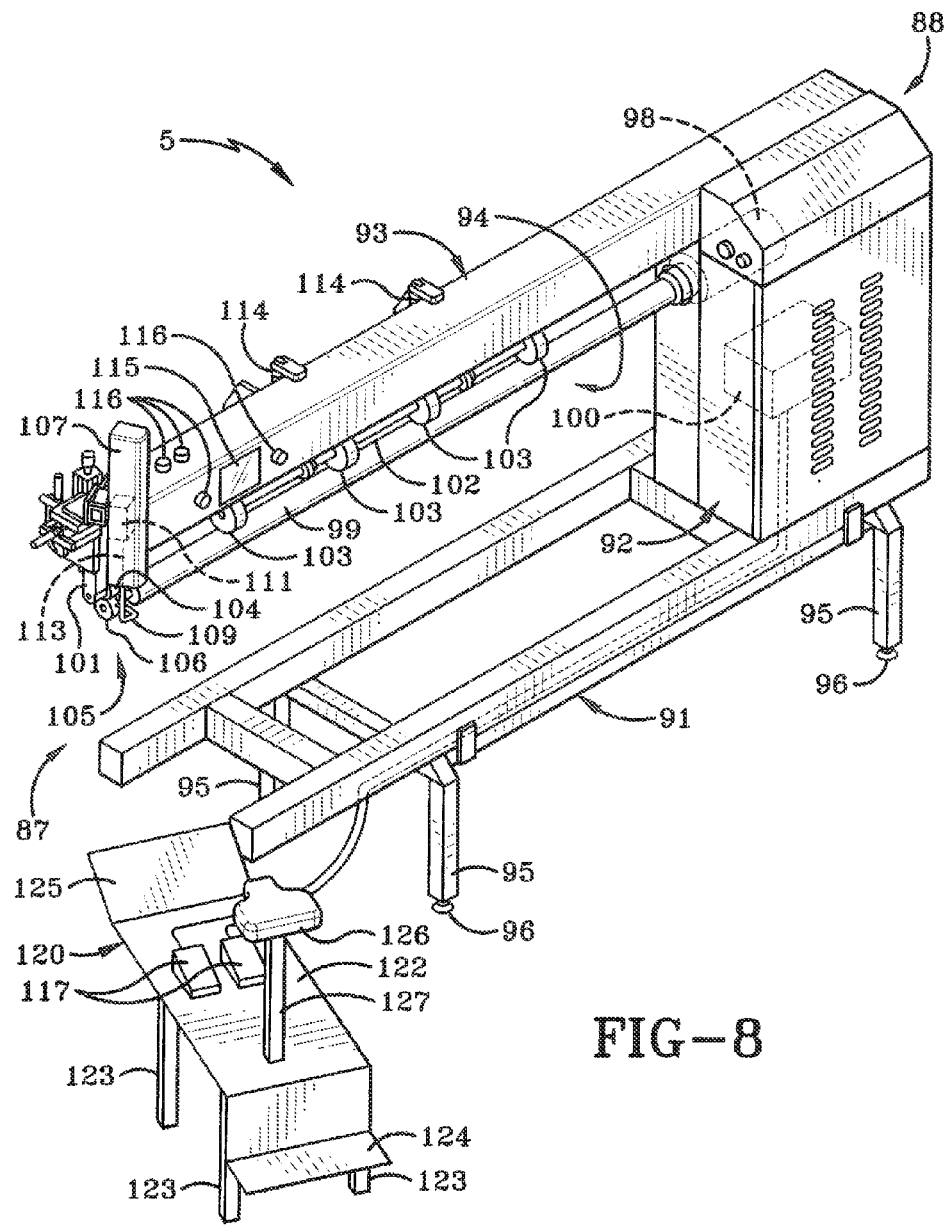
FIG. 8 illustrates a perspective view of a welding machine of the welding system.
Figure 9:
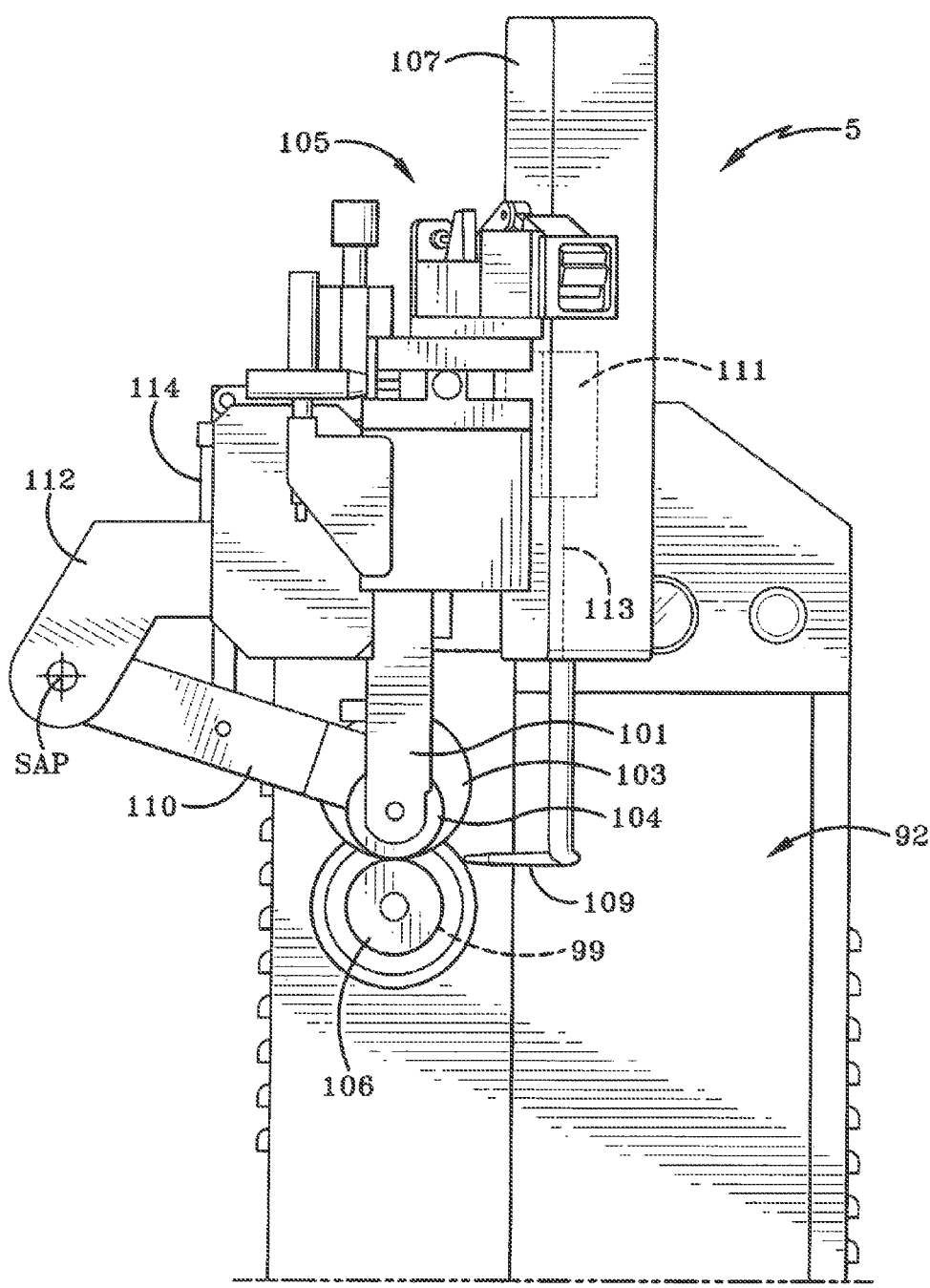
FIG. 9 illustrates a detailed view of a welding head of the welding machine of the welding system.

Turning now to the welding machine 5 and best seen in FIGS. 8 and 9, the welding machine 5 has left side 87 and a right side 88. The welding machine 5 may be similar to the "T-600" welding machine fabricated by Miller Weldmaster headquartered in Navarre, Ohio. A lower frame 91 extends from the left side 87 to the right side 88. A central body portion 92 is located at the right side 88 and an elongated upper beam 93 extends from the central body portion 92 to the left side 87. The lower frame 91, central body portion 92 and upper beam 93 form an open area 94 between these components into which various fabrics can be man manipulated during the weld process. The interiors of these components can have a frame formed with hollow metal beams, angle iron and/or with other material and in other ways as understood by one of ordinary skill in the art. The out layers of the welding machine 5 can be covered in sheet metal or other materials. The lower frame 91 can include elevated legs 95 and can have leveling devices 96 on bottom ends of the legs 95 used to level the welding machine 5.

The central body portion 92 houses a motor used to rotate a main roller 99 extending out of the central body portion 92. The main roller 99 is rotated by a motor 98 contained within the body portion 92. The central body portion 92 may house other components such as computer(s) and/or controller(s) used to implement control logic 100 that is used control and operate the welding machine as discussed later. Roller support arms extend downward from the upper beam 93 to support a secondary roller rod 102. Secondary rollers 103 are rotatably attached to the secondary roller rod 102 and preferably spaced apart. In some configurations, actuators can be attached to the roller support arms so that a pressure the secondary rollers 103 exert on fabric between them and the main roller 99 can be changed and controlled by an operator of the welding machine 5. As discussed later, the pressure can be controlled by a processor or other logic.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

A welding head assembly 105 is mounted to the upper beam 93 on the left side 88 of the welding machine 5. The welding head assembly 105 includes a welding device 107. As illustrated best in FIG. 9 the welding device 107 can have a hot air tube 109 with a nozzle for heating fabric to be welded together. In other configurations, the welding device 107 can be a "hot wedge" type of welding device that uses a hot metal wedge to heat fabric to be welded. An ambient air device 111 (FIG. 8) is attached to the welding head assembly 105 and can be combined with hot welding air in the hot air tube 109 to lower the temperature for some welds as discussed later when discussing the operation of the welding system. For example, tube 113 can be used to inject ambient air into hot air tub 109 to cool the hot air in that tube. Other ways of cooling the hot air can be used as understood by those of ordinary skill in the art.

The welding head assembly 105 also has an upper weld roller 104 and a lower weld roller 106 the provide pressure to a weld being created between them. A swing arm 110 is pivotally connected to a rigid support arm 112 at a swing arm pivot (SAP). A cylinder 114 contains an actuator to move arm 101 up and down to create the proper pressure between the upper weld roller 104 and a lower weld roller 106 as a weld as it is created.

The welding machine 5 can have other useful components and features. A user interface 115 as well as control knob and/or buttons 116 are positioned on the upper beam 93 near the left side 87 of the welding machine to allow an operator to control the heat of the welding device 107, the ambient air device 111 and the speed of the conveyer table 11 as well as other variable and parameters. In addition to the user interface 115, one or more foot pedal 117 types of device can be used control the conveyer table 11 and/or other variables and parameters associated with operating the welding system 1.

The welding system 1 can also include an operator platform 120. The operator platform 120 includes an elevated surface 122 elevated upon elongated legs 123. The operator platform 120 includes a step 124 to allow the operator to easily reach the elevated surface 122. The elevated surface 122 is also formed with a footrest 125 for the comfort of the operator. A seat 126 is mounted on a seat post 127 to further aid in the comfort of the operator.

Figure 10:
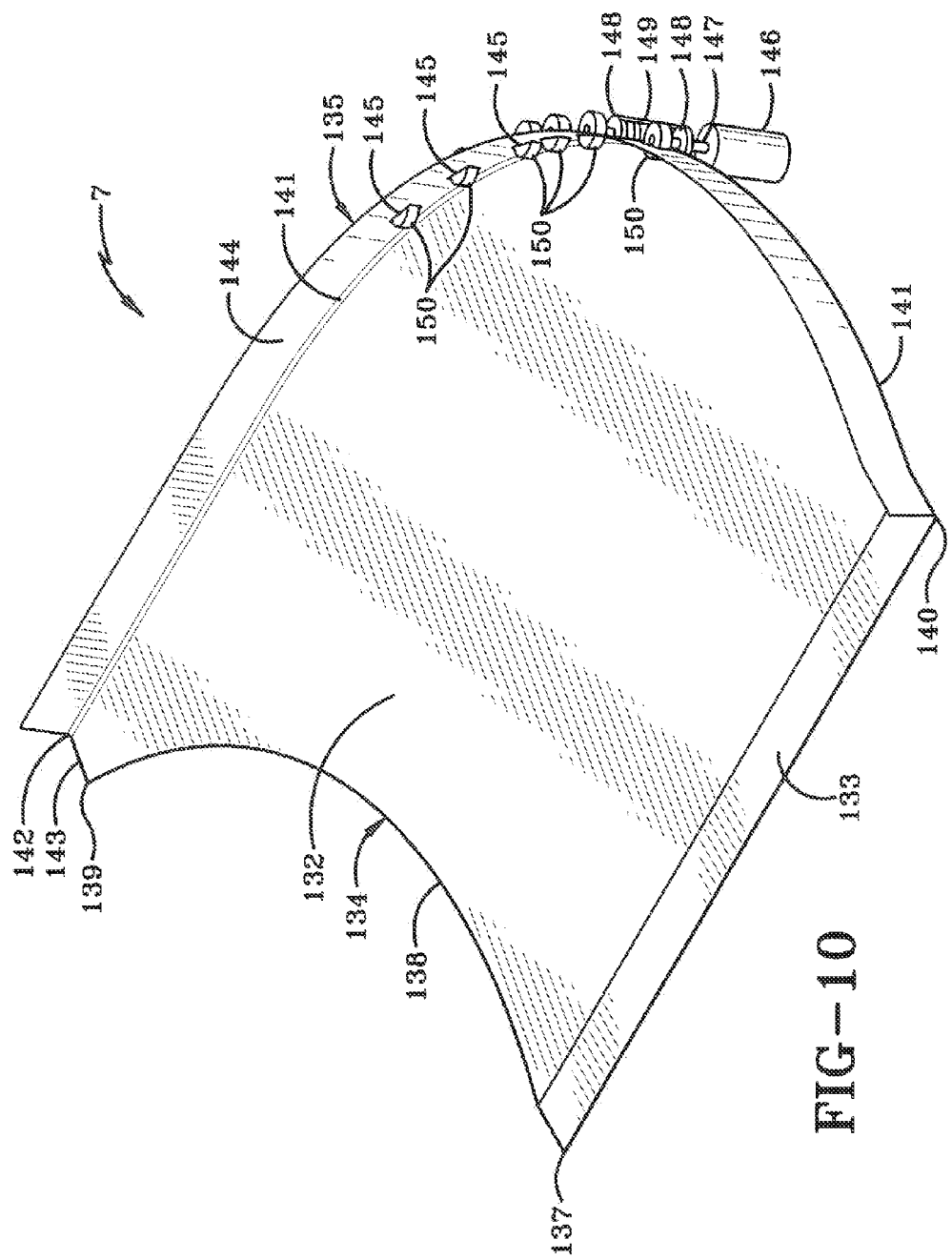
FIG. 10 illustrates a perspective view of a chute of the welding system.

The welding system 1 further includes a chute 130 (FIG. 10). As discussed later, the chute 130 is positioned between the welding machine 5 and the turntable 9 to aid in transferring welded sidewalls onto the turntable 9. The chute 130 has a main surface area 132. The main surface area 132 as well as other walls and components of the chute 130 are preferably formed with a rigid metal such as stainless steel but other materials can be used. The main surface area 132 as well as other areas of the chute that come into contact with welded fabric should ideally have a low coefficient of friction to allow the fabric to slide easily. A near tapered portion 133 of the main surface area 132 is tapered with respect to the rest of the main surface area 132 to allow fabric to easily slide from the welding machine 5 onto the chute 130.

The main surface area 132 has a curved interior side 134 and a curved exterior side 135. The interior side 134 begins at a left front corner 137 and forms a continuous curved edge 138 terminating at a left back corner 139. The exterior side 135 begins at a right front 140 corner and forms a continuous curved edge 141 terminating at a right back corner 142. When installed in the welding system 1, the front left corner 137 of the interior side 134 is located near the left side 87 of the welding machine 5 and the front right corner 140 of the exterior side 135 is located near the right side 88 of the welding machine. The interior side 134 and the exterior side 135 of the main surface area 132 are shaped so that the two sides form a "funnel" shape and approach each other at the left back corner 139 and the right back corner 142 so that a short linear edge 143 is formed between these two corners.

Figure 11:
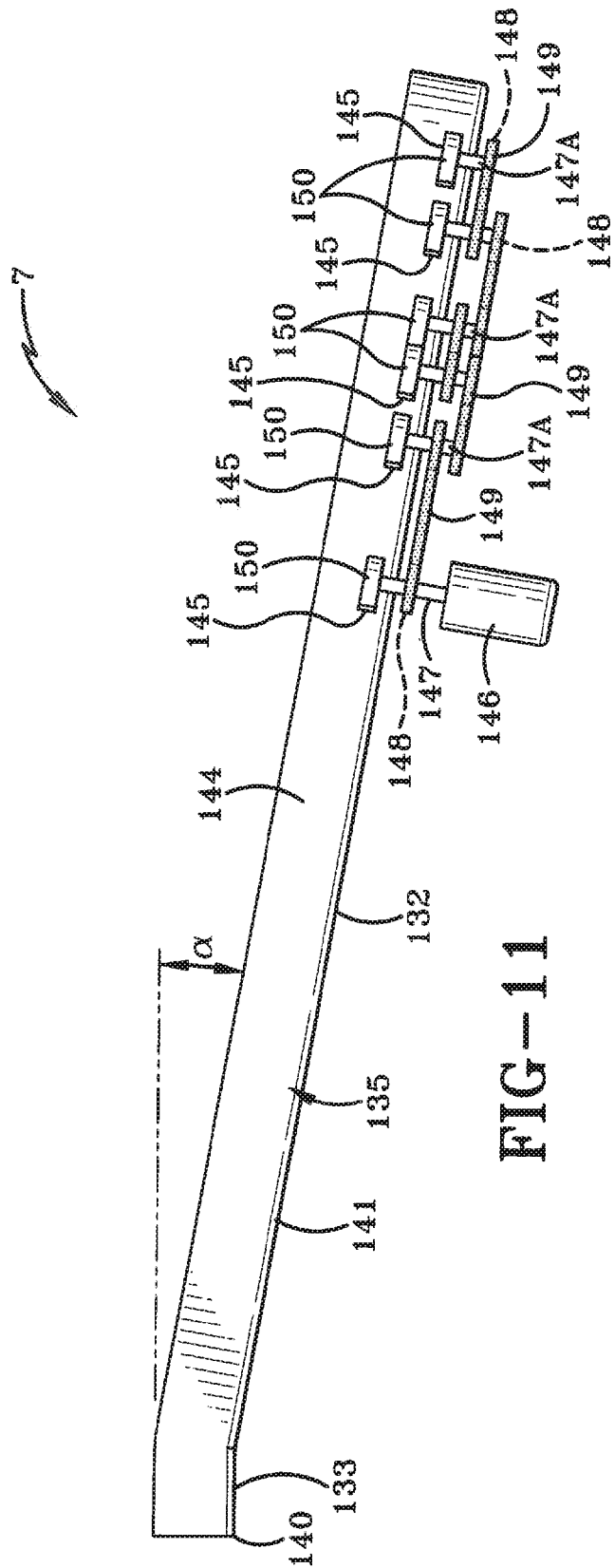
FIG. 11 illustrates a side view of a chute of the welding system.
Figure 12:
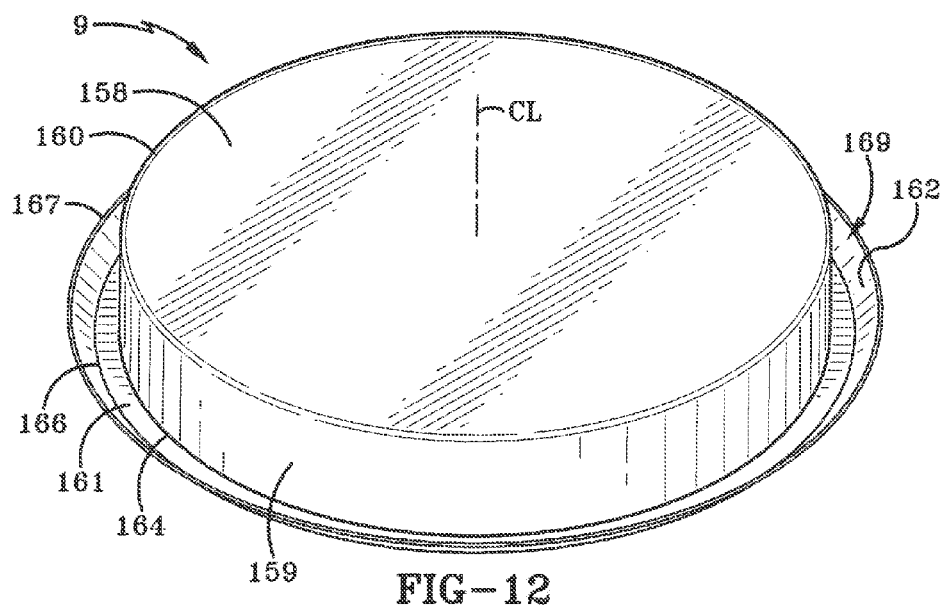
FIG. 12 illustrates a perspective view of a turntable of the welding system.
Figure 13:
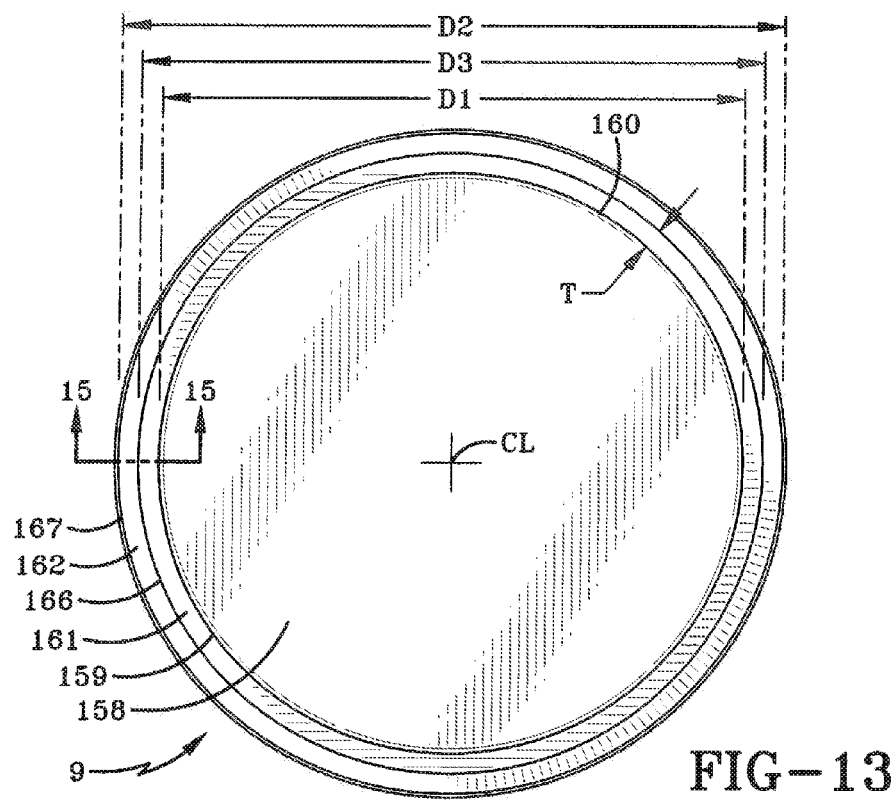
FIG. 13 illustrates a top view of a turntable of the welding system.
Figure 14:
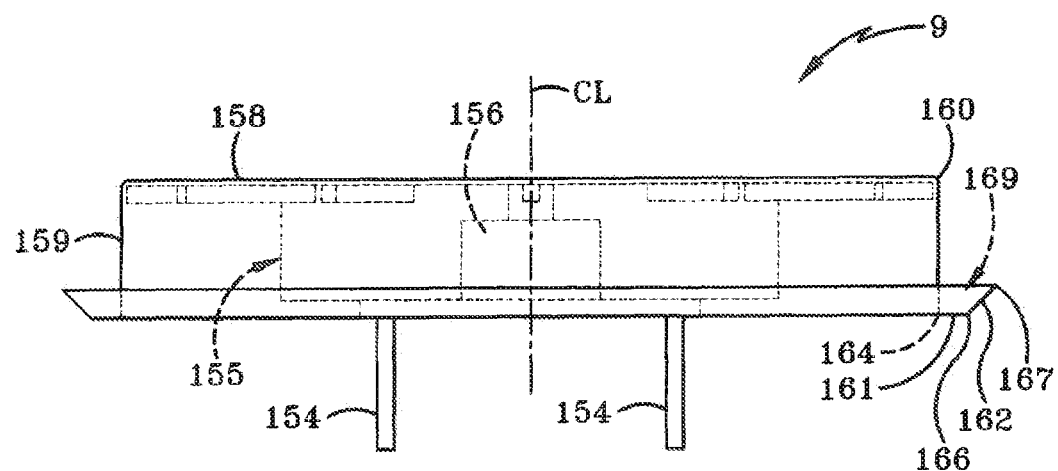
FIG. 14 illustrates a side view of a turntable of the welding system.
Figure 15:
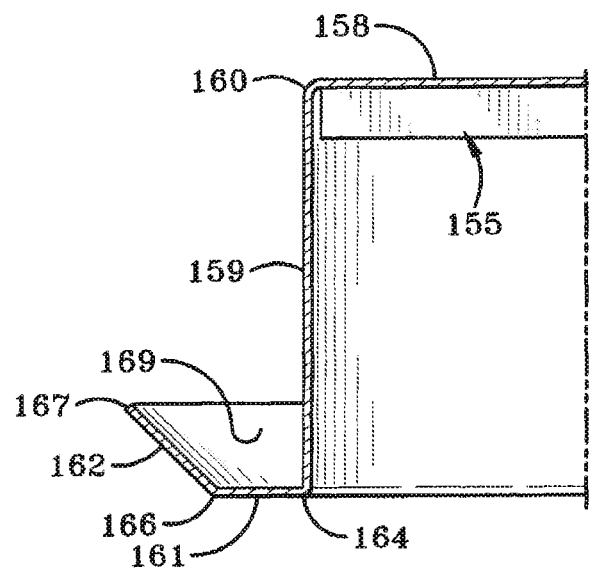
FIG. 15 illustrates a partial cross-sectional view of the turntable of the welding system.
Figure 16:
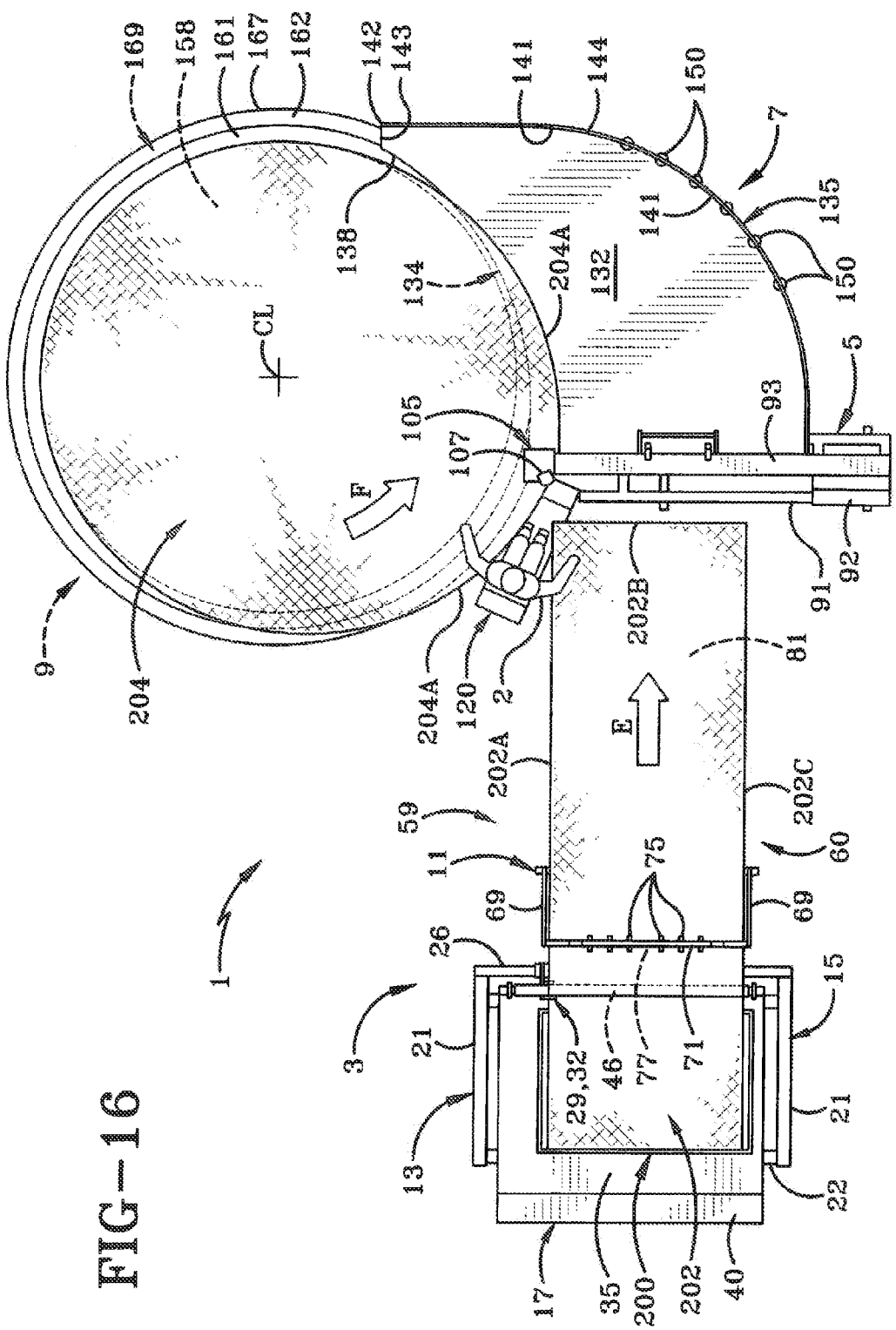
FIG. 16 illustrates the operation of the welding system before a weld is made using circular fabric.

In the preferred embodiment, the side wall chute 130 further includes an exterior side wall 144. The exterior side wall 144 is generally at right angles to the main surface area 132 and extends along the length of the exterior side 135 as illustrated. It can be formed with one or more segments of rigid material such as metal and may be formed with the same material as the main surface area 132. One or more openings 145 may be formed in the exterior side wall 144 and one or more rollers 150 can be mounted within these openings with part of the roller 150 extending through each side of the openings toward the interior side 134 so that fabric may come into contact with the rollers 150 can be guided toward the turntable by the rollers 150. At least some of the rollers can be driven with a motor 146 connect to a drive shaft 148 that is connected to a roller 150. As illustrated in FIG. 11, other drive shafts 147A, drive wheels and belts 149 can be used to drive the other rollers 150.

The turntable 9, as illustrated by example FIGS. 12-15 includes a rotating table 151 supported by a support structure 155. The support structure 155 includes legs 154. A motor 156 is supported by the support structure 155 and is adapted to rotate the rotating table about pivot point at centerline CL. Of course, one or more gears, pulleys, belts, etc. can be used to adjust the speed of the motor before applying it to the rotating table 151.

The rotating table 151 includes a top table wall 158 that is round in the preferred embodiment. However, in other embodiments, it can be a square, a rectangle, a polygon or another shape. In the preferred embodiment, the top table 158 wall is round with a diameter D1 of about 12 feet. Table top side walls 159 extend downward around an outside edge 160 of the top table wall 158. A lower trough wall 162 extends outward horizontally and parallel to the top table wall 158. The lower trough wall 161 extends from a lower edge 164 of the table side walls 159. A tapered trough wall 161 extends upward and away from an outside edge 166 of the lower trough wall 161. In the preferred embodiment, an upper outside edge 167 of the tapered trough wall 161 is round and has a diameter D2 of about 14 feet and the outside edge 166 of the lower trough wall 161 is round with a diameter D3 of about 13 feet. The thickness "T" of the lower trough wall 161 is about six inches and the lower trough wall 161 is tapered outward about six inches from the lower trough wall 161. In the preferred embodiment, the tapered trough wall 162 is a flat wall about 9 inches in length. Of course, the dimensions given for the example turntable 9 of the example illustration could be other values and other shape can be used other than what is illustrated.

As illustrated the lower portion of the table side wall 159, the lower trough wall 161 and the tapered trough wall 162 form a quadrilateral shaped trough chamber 169 extending around an outside perimeter of the rotating table 151. The trough chamber 169 can in other embodiments be C-shaped or other shapes.

In the preferred embodiment, the components of the rotating table 151 are formed out of a rigid material such as sheet metal or another relatively rigid material. The components of the rotating table 151 can be formed out of a single piece of material or one or more pieces that are welded together of connected together in another way.

In another configuration, the turntable 9 can have an adjustable telescoping arm in its center that may be elevated when sheets of fabric are too large for the turntable. This would allow the turntable 9 to account for the slack of larger pieces of fabric.

Having described the components of the welding system 1, its use and operation will now be described with reference to FIGS. 16-24. A weld process begins by loading side wall fabric 202 (FIG. 16) that has a left side 202A a front end 202B and a right side 202C onto the fabric feed assembly 3. Next, the front end 202B of the fabric 202 is treading between the drive roller 77 and the inertia rollers 75 of the conveyer table 11 and then to the welding machine 5 in the direction of arrow E. Similarly a large sheet of fabric 204 that is to be welded to the side wall fabric is place evenly on the turntable 9.

An operator 2 selects either hot air welding or hot wedge welding and prepares the proper components at the welding head assembly 105 of the welding machine 5. After the required components are attached and properly positioned at the head assembly 105, the operator 2 can now select through the user interface 115 a speed for the turntable 9 and the fabric feed assembly 3 to deliver fabric to the welding machine 5. The operator 2 also at the user interface 115 selects a welding temperature and the pressure between the main roller 99 and the secondary rollers 102 as well as a pressure between the weld roller 104 and a lower weld roller 106 of the welding machine 5. For example, for a thick fabric a hot air weld can be selected and a 1350 degree Fahrenheit temperature can be selected. A hot air weld is generally ⅝ of an inch in thickness. For a thin fabric a hot wedge weld can be used and a 850 degree Fahrenheit temperature can be selected. In some embodiments, the operator can additionally select a pressure to be exerted between the main roller 99 and the secondary rollers 103 of the welding machine 5.

Figure 17:
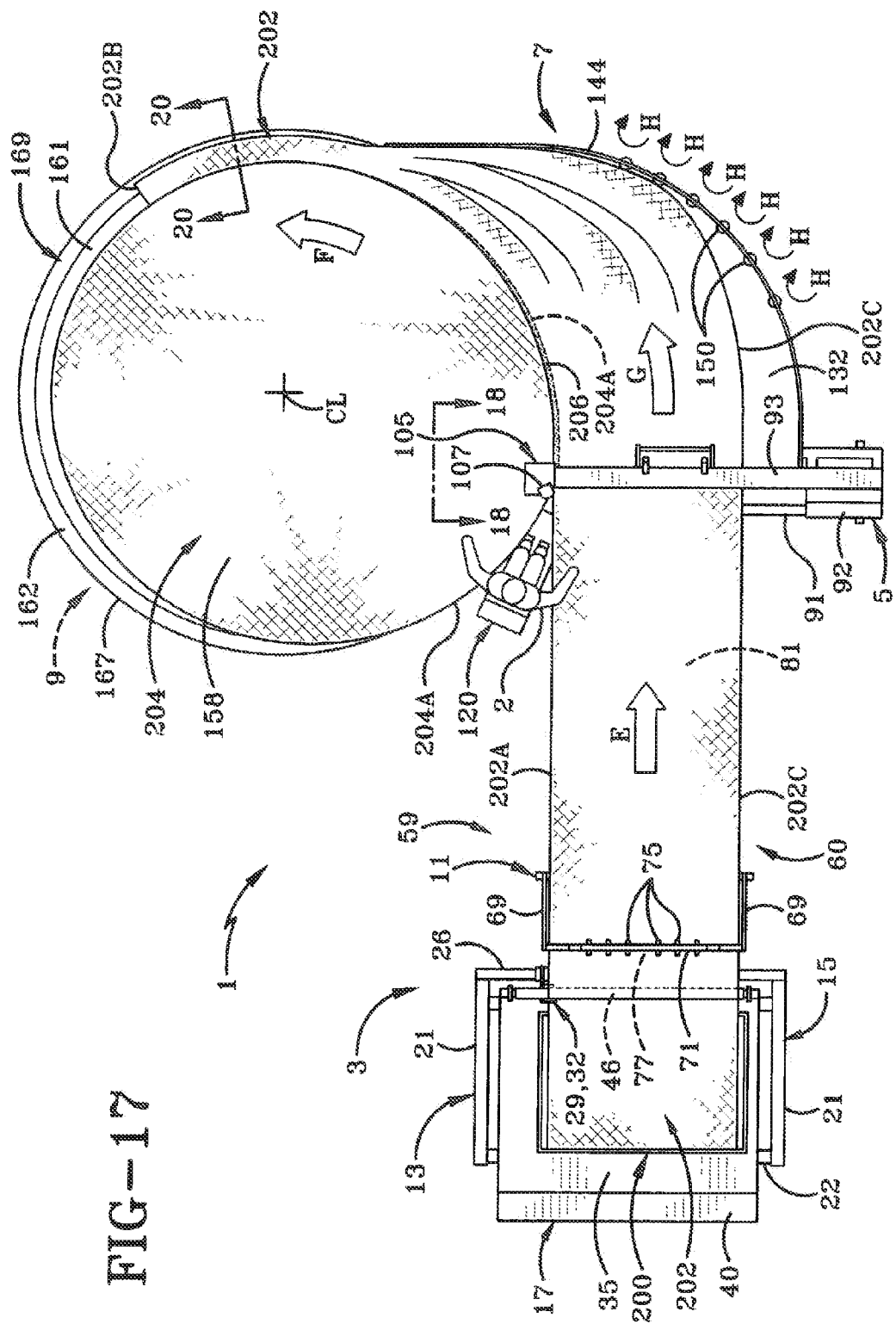
FIG. 17 illustrates the operation of the welding system while a weld is made using circular fabric.
Figure 18:
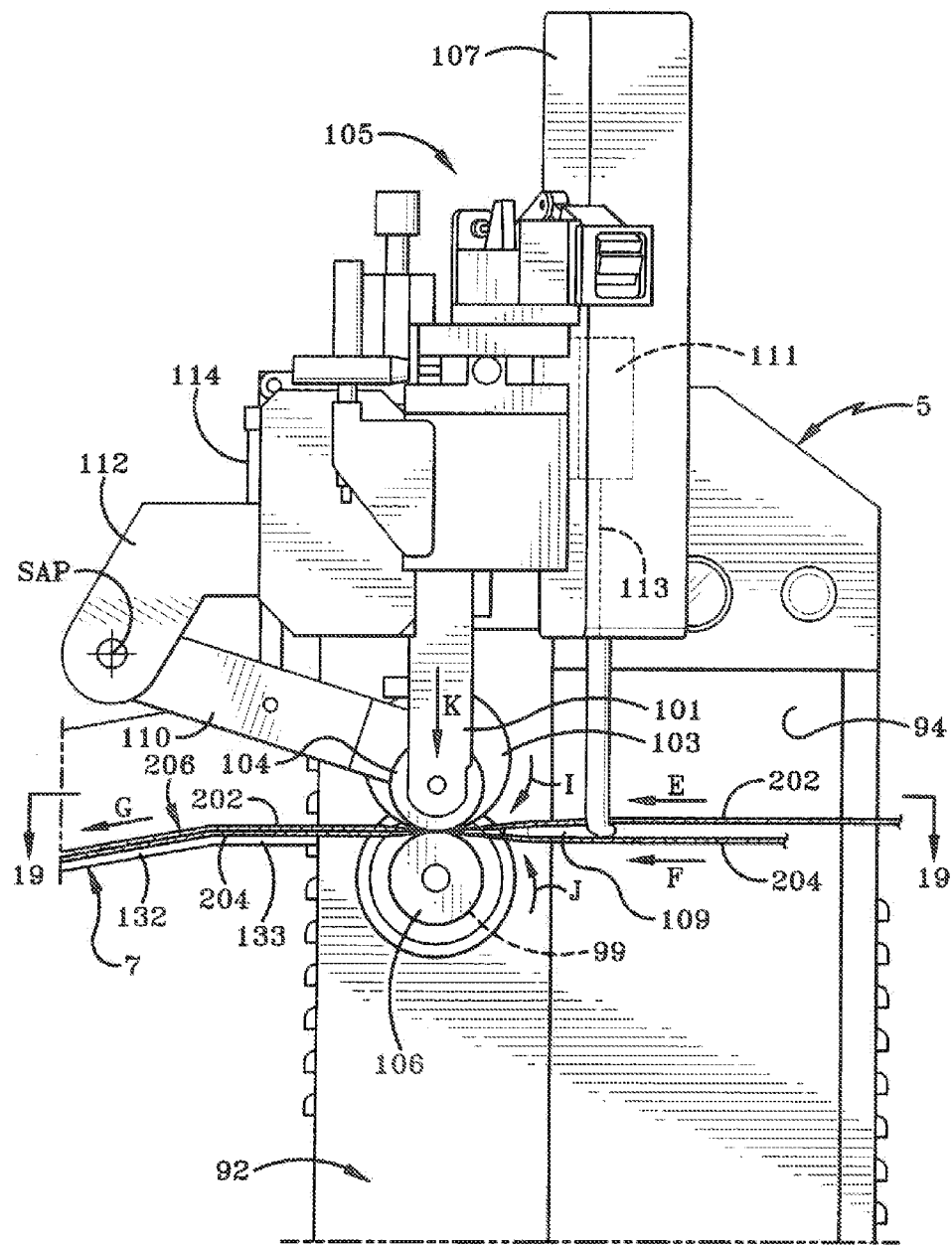
FIG. 18 illustrates a detailed view of the welding machine while a weld is made using circular fabric.

When all required parameters have been entered, the welding process is initiated. This can be done, for example by pressing a foot pedal 117. When in operation, the turntable moves fabric 204 in the direction of arrow F and the conveyor table 11 moves fabric 202 in the direction of arrow E. Welded fabric with weld 206 exits the welding machine 5 in the direction of arrow G (FIG. 17). As illustrated best in FIG. 19, arm 101 moves in the direction of arrow K as it is controlled by cylinder 114 to be sure the proper pressure is created by upper weld roller 104 and a lower weld roller 106 as upper weld roller 104 rotated in the direction of arrow I and the lower weld roller rotates in the direction of arrow J. As the fabric feed assembly 3 pulls fabric from the movable platform 17 he location of an edge 202C of the fabric is monitored by the photo eye 32 and reported to controller logic 100 that may be located in the welding machine 5. The controller logic 100 can control the actuator 49 to move the movable platform 17 in the direction of arrow B (FIG. 2) to realign the edge 202C to a proper location.

Figure 19:
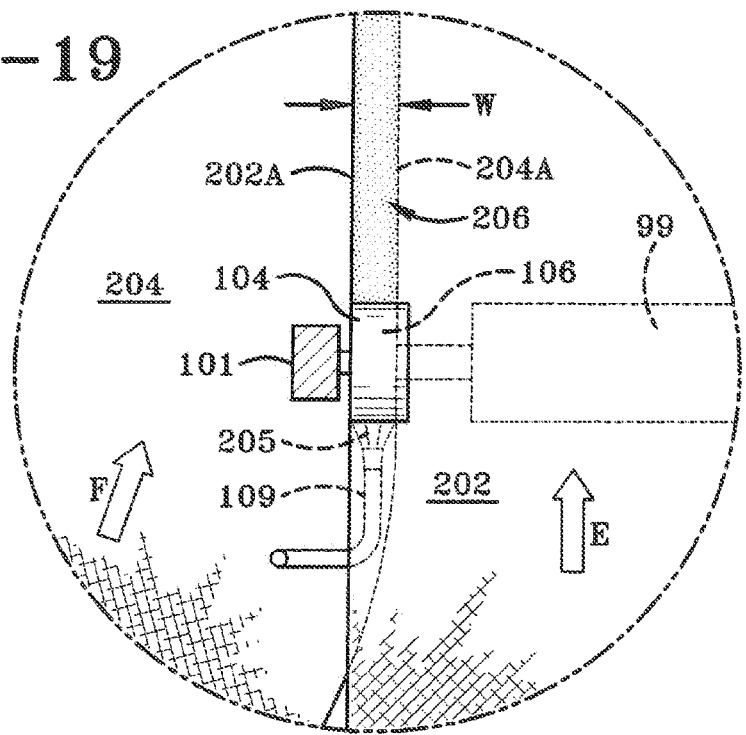
FIG. 19 illustrates a detailed view of a weld of wall fabric to circular fabric.
Figure 20:
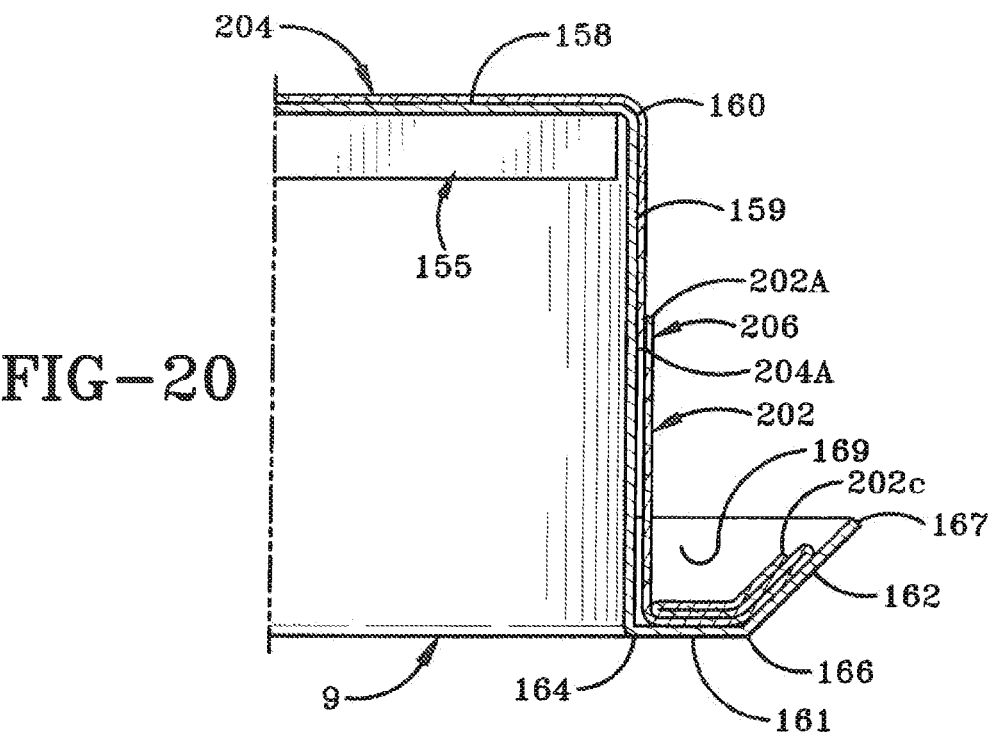
FIG. 20 illustrates how welded fabric is collected in a trough while a weld is made using circular fabric.

When making relatively straight welds, the two pieces of fabric 200, 204 are overlapped and feed through the welding device 107 at a relatively constant speed. As fabric is feed into the welding machine 107 it is heated with hot air 205 so that the two pieces of fabric melt together form a weld 206. For example, FIG. 19 illustrates a weld of width W being created. The upper weld roller 104 and a lower weld roller 106 of welding machine 5 press the welded material together to further strengthen the weld. The welded material then passes onto the chute 130 where it is guided in the direction of arrow G by the shape of the chute 130 onto the turntable 9. Motorized and/or non-motorized rollers 150 in the chute 130 help guide bunched fabric onto the turntable 9. Excess welded side wall material is guided into the trough chamber 169 by the shape of the chute 130 and the turntable 9 as illustrated in FIG. 20.

In many applications it is desirable to make an angled weld such as a 90 degree (corner) angled weld. However, it can be extremely difficult to accomplish this at normal operating speeds of about 15 feet per minute. To begin an angle weld such as turning a 90 degree corner, the operator can step on a foot pedal 117 and simultaneously: (1) cause the heat of the welder to be lower (2) reduce the speed that fabric is feed to the welding machine 5 and (3) added ambient air to the hot air used to create the weld and/or applying ambient air to an area where welding occurs. Of course, any combination of these variables can be controlled when welding a corner. For example, when a 90 degree turn is made when a corner is formed in the fabric, ambient air is blown onto the weld and the speed of the fabric at the welding point is reduced from 15 feet per minute to about 3 feet per minute. In the preferred embodiment, a single operator can operate the welding system 1 and that operator can step on a single foot pedal to change one or more of the weld temperature, speed, blowing of ambient air and/or the pressure of the fabric between rollers after a weld. For example, the controller logic 100 located in the welding machine (or elsewhere) can make the appropriate weld temperature, speed, blowing of ambient air and/or the pressure of the fabric between rollers solely receiving a single to change speed. For example, solely upon its detecting that the foot pedal 117 has been depressed. Alliteratively, the controller logic 100 can make changes to one or more of these parameters in proportion to a distance that a foot pedal 117 is depressed. Preferably, when the speed is changed, the speed of the conveyer table 11, the welding machine 5 and the turntable 9 are all simultaneously changed so that they move fabric through the welding machine 5 at the same rate.

Figure 21:
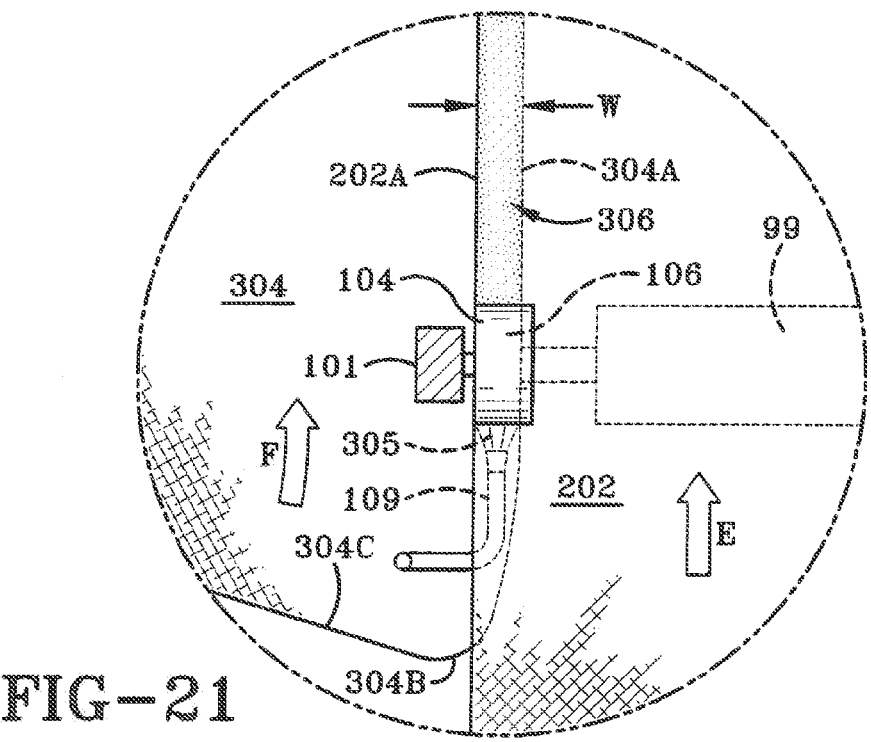
FIGS. 21-24 illustrate some of the steps of creating a corner weld using fabric with a 90 degree corner.
Figure 22:
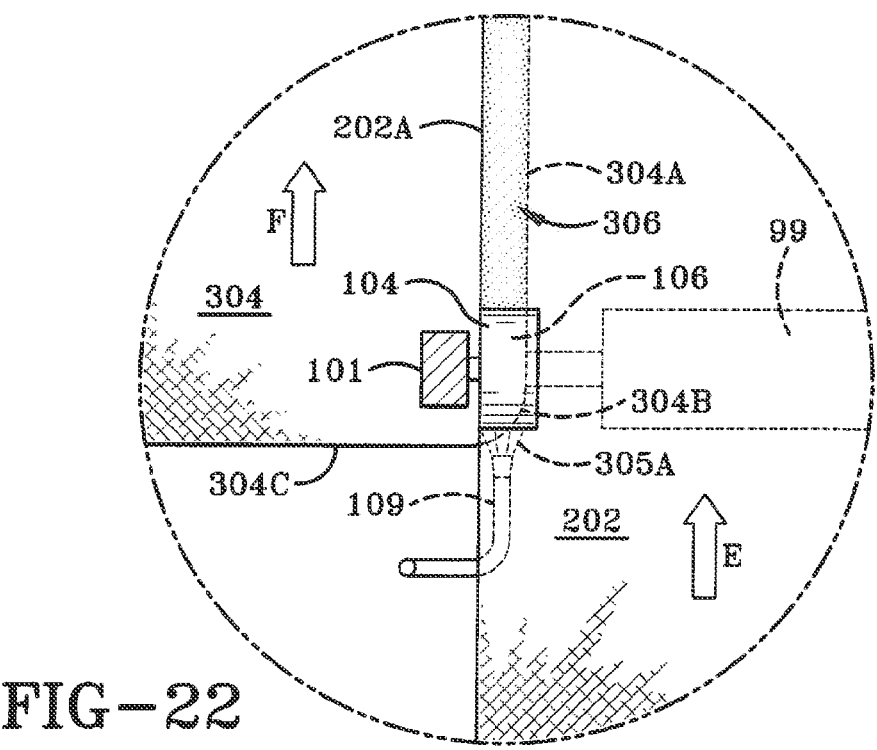
Figure 23:
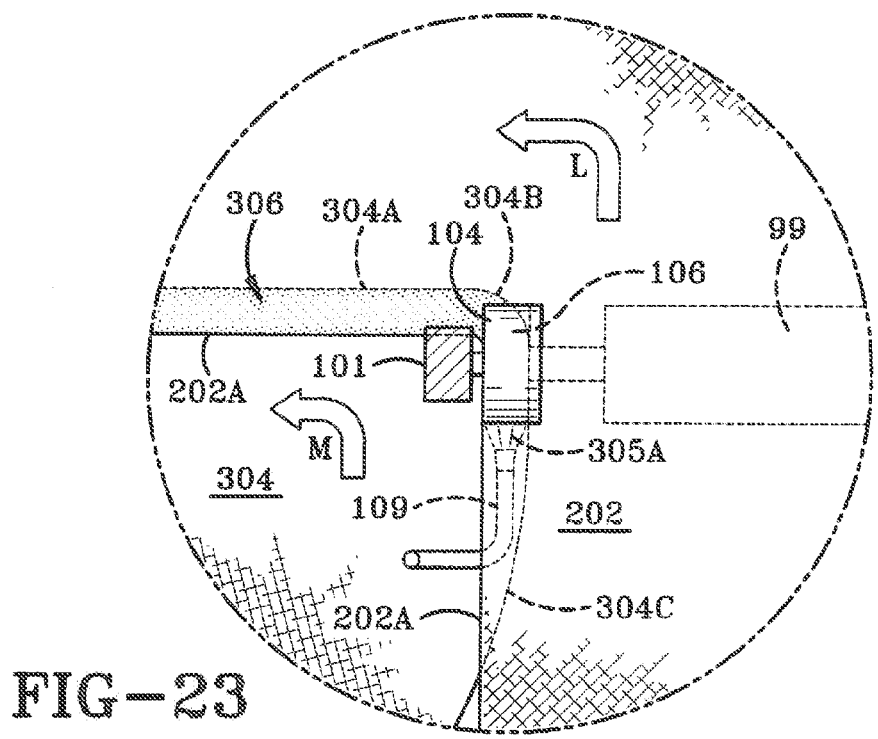
Figure 24:
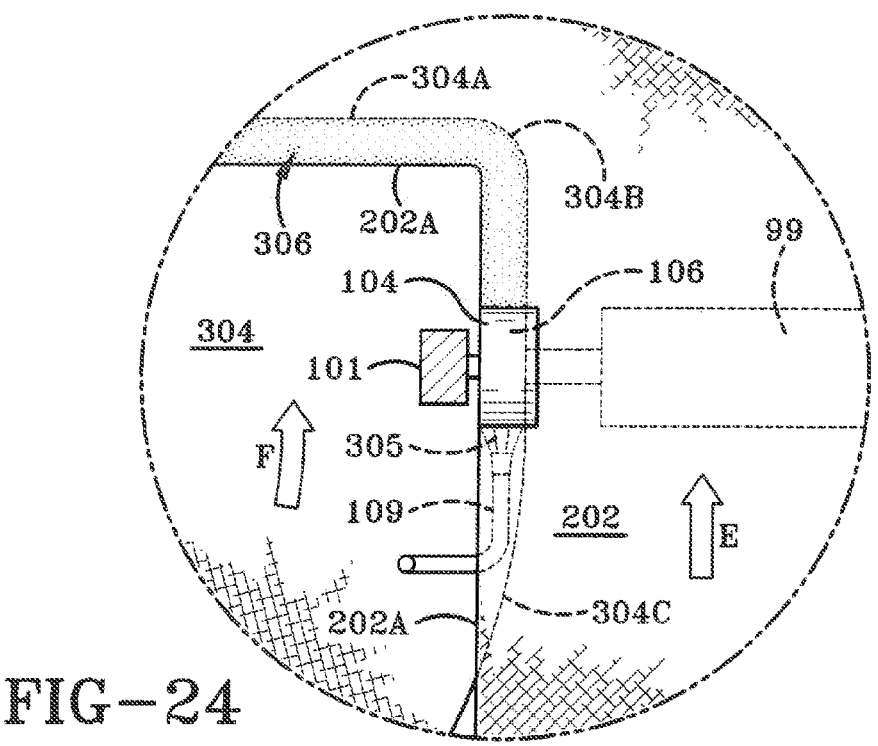

FIGS. 21-24 illustrated creating a 90 degree corner weld with a rectangular shaped fabric 304 and side wall fabric 202. First a straight weld is performed on edges 202A and 304A using hot welding air 305 (FIG. 21). Next, as the weld seam approaches corner 304B between edges 304A and 304C the hot welding air 305 is injected with ambient air as discussed above to product cooler welding air 305A that is not as hot as hot welding air 305. As illustrated in example FIG. 23, the corner weld is performed by moving fabric in the directions of arrow L and arrow M using the cooler welding air 305A and lower roller speeds and possible less pressure between upper weld roller 104 and a lower weld roller 106. Finally, as illustrated in FIG. 24, after rounding creating a corner weld at corner 304B an other straight weld is created using hot welding air 305 and faster roller speeds between fabric edges 202A and 304C.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 25:
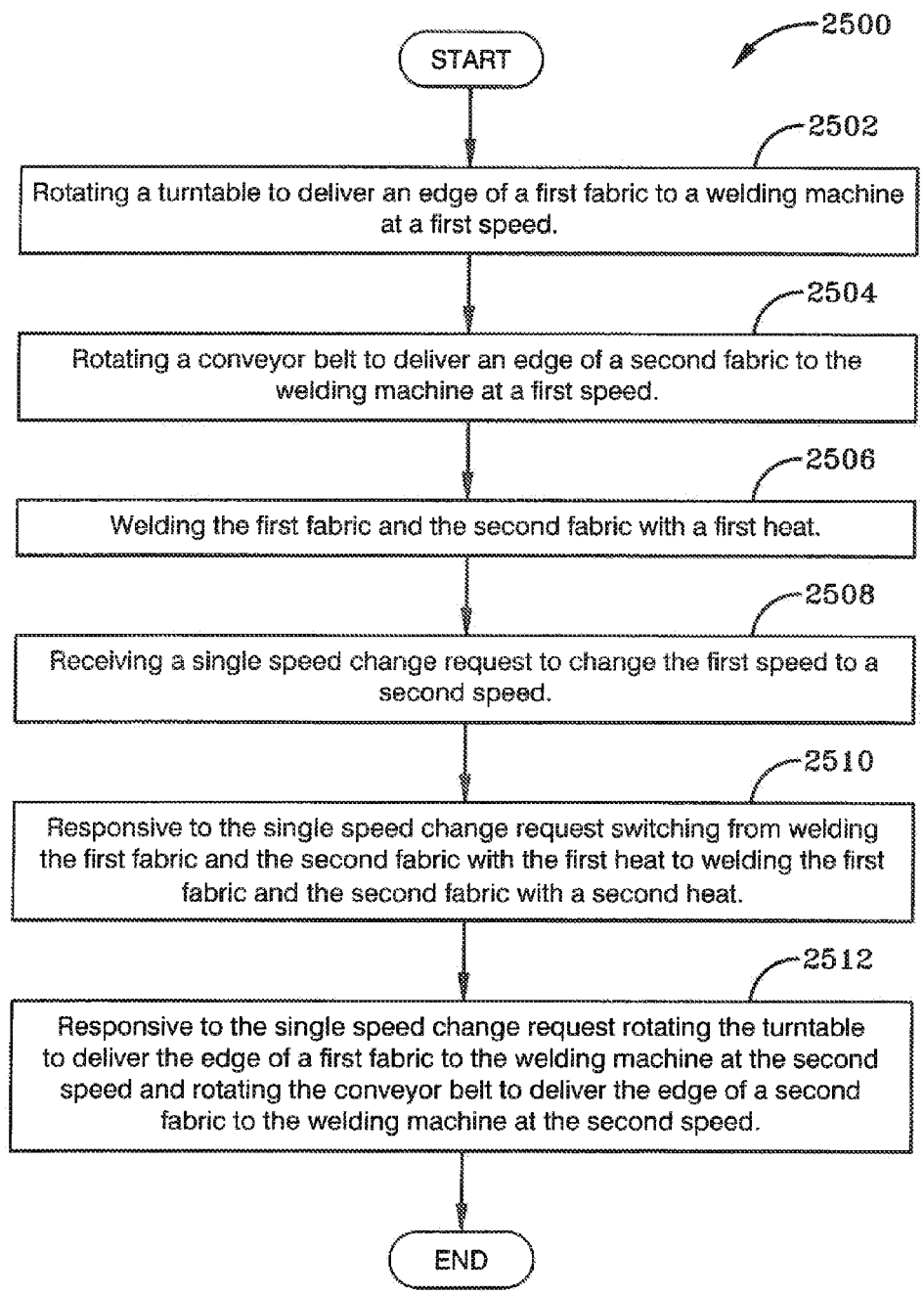
FIG. 25 illustrates an embodiment of a method for welding fabric together at a 90 degree corner.

FIG. 25 illustrates a method 25 of welding two pieces of flexible fabric together. The method 2500 rotates turntable, at 2502, to deliver an edge of a first fabric to a welding machine at a first speed. The method also rotates, at 2504, a conveyer belt to deliver an edge of a second fabric to the welding machine at the first speed. The turntable and conveyer belt are similar to the turntable and conveyer table discussed above. The first fabric and the second fabric are welded, at 2506, with a first heat.

After having welded some of the first fabric and the second fabric, a single request is received, at 2508, to change the first speed to a second speed. Responsive to the single request to change the first speed to the second speed, the method 2500 switches from welding first fabric and the second fabric with the first heat to welding the first fabric and the second fabric with a second heat, at 2510. Also, responsive to the single request to change the first speed to the second speed the method 2500 rotates the turntable to deliver the edge of a first fabric to the welding machine at the second speed and rotating the conveyer belt to deliver the edge of a second fabric to the welding machine at the second speed, at 2512. The method 2500 is also novel because it can be performed by a single person. The method 2500 can in other configurations perform some of the actions discussed above with reference to the welding system 1.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A welding system for welding two piece of fabric comprising:
    a fabric welding machine;
    a conveyer table adapted to feed an non-welded sidewall fabric to the welding machine at a first speed;
    a turntable adapted to rotate to feed an non-welded second fabric to the welding machine at the first speed so that an edge of the second fabric overlaps an edge of the sidewall fabric;
    wherein the welding machine is stationary and is configured to weld the non-welded sidewall fabric to the non-welded second fabric using a first welding temperature as the non-welded sidewall fabric and the non-welded second fabric past through the welding machine at the first speed;
    a main roller in the welding machine adapted to the roll sidewall fabric and the second fabric that have been welded together as a welded fabric through the welding machine at the first speed;
    a controller logic configured to detect a single request for a change of a parameter at a user interface, and wherein when the controller detects the single request for the change of the parameter the controller is configured to change at least one of the group of: the first welding temperature to a second welding temperature, change the speed of the turntable so that the second fabric is delivered to the welding machine at a second speed that is different than the first speed, and change the speed of the conveyer table so that the first fabric is delivered to the welding machine at the second speed; and
    a fabric feed assembly adapted to feed the non-welded sidewall fabric to the conveyer table, wherein the fabric feed assembly comprises:
        a fixed frame adapted to sit on a surface and not move; and
        a movable platform adapted to hold the non-welded sidewall fabric;
    wherein the fixed frame further comprises an alignment detection device configured to determine if an edge of the non-welded sidewall fabric is aligned with a predetermined location as the non-welded sidewall fabric is fed to the conveyer table and wherein an alignment adjustment logic is configured to cause the movable platform to move to align the edge of the non-welded sidewall fabric with the predetermined location when the edge of the non-welded sidewall fabric is not aligned with the predetermined location.

2. The welding system for welding two piece of fabric of claim 1 wherein the user interface further comprises:
    a foot pedal, and wherein the controller logic is adapted to detect the request for a change of a parameter as a request for a change of speed upon a depression of the foot pedal.

3. The welding system for welding two piece of fabric of claim 2 wherein:
    the controller logic is configured to determine the second speed as a speed proportional to an amount of depression of the foot pedal.

4. The welding system for welding two piece of fabric of claim 1 further comprising:
    an linear actuator mechanically connecting the movable platform to the fixed fame, and wherein the alignment adjustment logic is configured to cause the linear actuator to move the movable platform relative to the fixed frame to align the edge of the non-welded sidewall fabric with the predetermined location when the edge of the non-welded sidewall fabric is not aligned with the predetermined location.

5. The welding system for welding two piece of fabric of claim 4 wherein the alignment detection device is a photoelectric sensor.

6. A welding system for welding two piece of fabric comprises:
    a fabric welding machine;
    a conveyer table adapted to feed an non-welded sidewall fabric to the welding machine at a first speed;
    a turntable adapted to rotate to feed an non-welded second fabric to the welding machine at the first speed so that an edge of the second fabric overlaps an edge of the sidewall fabric;
    wherein the welding machine is stationary and is configured to weld the non-welded sidewall fabric to the non-welded second fabric using a first welding temperature as the non-welded sidewall fabric and the non-welded second fabric past through the welding machine at the first speed;
    a main roller in the welding machine adapted to the roll sidewall fabric and the second fabric that have been welded together as a welded fabric through the welding machine at the first speed;
    a controller logic configured to detect a single request for a change of a parameter at a user interface, and wherein when the controller detects the single request for the change of the parameter the controller is configured to change at least one of the group of: the first welding temperature to a second welding temperature, change the speed of the turntable so that the second fabric is delivered to the welding machine at a second speed that is different than the first speed, and change the speed of the conveyer table so that the first fabric is delivered to the welding machine at the second speed; and
    a chute for placement between the turntable and a rear side of the welding machine adapted to guide welded fabric from the welding machine onto the turntable.

7. The welding system for welding two piece of fabric of claim 6 wherein the chute further comprises:
    a main surface area with a straight front side adjacent the welding machine, a straight rear side adjacent the turntable that is at least 6 times shorter than the straight front side;

a curved interior side that begins at a left side of the straight front side and ends at a left side of the straight rear side; and a curved exterior side that begins at a right side of the straight front side and ends at a right side of the straight rear side.

8. The welding system for welding two piece of fabric of claim 7 further comprising:

a wall extending upward from the curved exterior side that is at 90 degrees to the main surface area; and one or more rollers extending through openings in the wall so that the one or more rollers are adapted to roll welded fabric toward the turntable.

9. A welding system for welding two piece of fabric comprises:

a fabric welding machine;

a conveyer table adapted to feed an non-welded sidewall fabric to the welding machine at a first speed;

a turntable adapted to rotate to feed an non-welded second fabric to the welding machine at the first speed so that an edge of the second fabric overlaps an edge of the sidewall fabric;

wherein the welding machine is stationary and is configured to weld the non-welded sidewall fabric to the non-welded second fabric using a first welding temperature as the non-welded sidewall fabric and the non-welded second fabric past through the welding machine at the first speed;

a main roller in the welding machine adapted to the roll sidewall fabric and the second fabric that have been welded together as a welded fabric through the welding machine at the first speed;

a controller logic configured to detect a single request for a change of a parameter at a user interface, and wherein when the controller detects the single request for the change of the parameter the controller is configured to change at least one of the group of: the first welding temperature to a second welding temperature, change the speed of the turntable so that the second fabric is delivered to the welding machine at a second speed that is different than the first speed, and change the speed of the conveyer table so that the first fabric is delivered to the welding machine at the second speed;

a table top wall adapted to receive the non-welded second fabric;

a table side wall extending downward around an entire perimeter of the table top wall; and a trough formed at a lower end of the table side wall and extending continuously along the entire lower end of the table side wall, wherein the trough is formed as a chamber with an opening at a top of the chamber adapted to receive welded fabric that overhangs the table top wall and table side wall.

10. The welding system for welding two piece of fabric of claim 9 wherein the table top wall is round and the table side wall is cylindrical in shape.

11. The welding system for welding two piece of fabric of claim 10 wherein the trough further comprises:

a lower trough wall that is flat and has an circular outside bottom wall edge and a circular inside bottom wall edge, wherein the inside bottom wall edge is attached to the lower end of the table side wall and is formed at 90 degrees to the table side wall; and a tapered trough wall that has a circular tapered wall edge that is round, wherein the circular tapered wall edge is attached to the outside bottom wall edge and wherein the tapered trough wall and the lower trough wall are formed with an obtuse angle at the circular tapered wall edge.

12. A welding system for flexible fabric comprising:

a welding machine adapted to weld a first fabric to a second fabric using a first heat;

a roller on the welding machine adapted to roll at a first speed at least one of group of: the first fabric and the second fabric through the welding machine;

a user interface adapted to send a single speed control signal to the welding machine in response to a single action by an operator of the welding machine;

wherein in response of the single speed control signal the welding machine changes from the first heat to a second heat and the welding machine changes the speed of the roller from the first speed to a second speed;

a turntable with a flat upper surface adapted to deliver the second fabric to the welding machine at a same rate as the roller on the welding machine; and a chute adapted to guide welded fabric from the welding machine onto the turntable.

13. The welding system of claim 12 further comprising:

a conveyer table comprising:

a conveyer belt adapted to deliver the first fabric to the welding machine at a same rate as the roller on the welding machine.

14. The welding system of claim 13 further comprising:

an alignment device adapted to align an edge of the first fabric with a reference point as the first fabric is moved onto the conveyer belt.

15. The welding system of claim 12, wherein the turntable further comprises:

a trough adapted to receive excess welded fabric that does not fit on an upper surface of the turntable.

16. The welding system of claim 12 wherein the user interface is a foot pedal.

* * * * *